(12) United States Patent
Levesque et al.

(10) Patent No.: US 11,939,244 B2
(45) Date of Patent: Mar. 26, 2024

(54) TREATMENT OF FERTIGATION WATER

(71) Applicant: UNIVERSITY OF GUELPH, Guelph (CA)

(72) Inventors: Serge Levesque, Guelph (CA); Thomas Graham, Guelph (CA); Dorin Bejan, Guelph (CA); Jamie Lawson, Guelph (CA); Mike Dixon, Guelph (CA); Ping Zhang, Guelph (CA)

(73) Assignee: UNIVERSITY OF GUELPH, Guelph (CA)

( * ) Notice: Subject to any disclaimer, the term of this patent is extended or adjusted under 35 U.S.C. 154(b) by 386 days.

(21) Appl. No.: 16/674,572

(22) Filed: Nov. 5, 2019

(65) Prior Publication Data
US 2020/0354239 A1    Nov. 12, 2020

Related U.S. Application Data

(60) Provisional application No. 62/845,302, filed on May 8, 2019.

(51) Int. Cl.
*C02F 1/46* (2023.01)
*A01C 23/04* (2006.01)
(Continued)

(52) U.S. Cl.
CPC .......... *C02F 1/4674* (2013.01); *A01C 23/042* (2013.01); *C02F 1/46109* (2013.01);
(Continued)

(58) Field of Classification Search
CPC ...... C02F 1/46; C02F 1/32; C02F 1/48; C02F 1/42; C02F 1/72; A01C 23/042; Y02P 60/21; Y02W 10/37
See application file for complete search history.

(56) References Cited

U.S. PATENT DOCUMENTS

| | | | |
|---|---|---|---|
| 5,419,824 A * | 5/1995 | Weres | C25B 11/091 |
| | | | 204/268 |
| 7,335,291 B2 * | 2/2008 | Kondo | A01G 31/00 |
| | | | 204/230.2 |

(Continued)

FOREIGN PATENT DOCUMENTS

| | | | | |
|---|---|---|---|---|
| CN | 103402353 A | * | 11/2013 | ............. A01G 33/00 |
| CN | 107473841 A | * | 12/2017 | |

(Continued)

OTHER PUBLICATIONS

Serge Lévesque, "Comparative Analyses of Conventional and Novel Water Treatment Technologies for Recirculating Greenhouse Fertigation Solutions", Sep. 1, 2019 (Sep. 1, 2019), [online] [retrieved on Jul. 7, 2020 (Jul. 7, 2020)]. Retrieved from the Internet: <https://atrium.lib.uoguelph.ca/xmlui/handle/10214/17460>.

(Continued)

*Primary Examiner* — Walter D. Griffin
*Assistant Examiner* — Cameron J Allen
(74) *Attorney, Agent, or Firm* — Shumaker, Loop & Kendrick, LLP

(57) ABSTRACT

Methods and systems for electrochemical treatment of fertigation water for use and for recycling in agricultural systems such as in controlled environment agricultural systems.

18 Claims, 22 Drawing Sheets

(51) Int. Cl.
  *C02F 1/461*  (2023.01)
  *C02F 1/467*  (2023.01)
(52) U.S. Cl.
  CPC .............. *C02F 2001/46142* (2013.01); *C02F 2201/4614* (2013.01); *C02F 2201/46145* (2013.01); *C02F 2209/06* (2013.01); *C02F 2303/04* (2013.01)

(56) References Cited

U.S. PATENT DOCUMENTS

| | | | |
|---|---|---|---|
| 2003/0178373 A1 | | 9/2003 | Kondo et al. |
| 2007/0138020 A1* | | 6/2007 | Balagopal ................. C25B 1/26 |
| | | | 205/500 |
| 2010/0311167 A1* | | 12/2010 | Wood .................... B01F 3/0853 |
| | | | 435/375 |

FOREIGN PATENT DOCUMENTS

| | | | | |
|---|---|---|---|---|
| WO | WO-0200554 A1 | * | 1/2002 | ............. C02F 1/467 |
| WO | WO-2007044609 A1 | * | 4/2007 | ............. B01D 61/44 |
| WO | WO-2012006630 A1 | * | 1/2012 | ............. A01N 59/00 |

OTHER PUBLICATIONS

Lévesque et al., "Inactivation of Rhizoctonia solani in fertigation water using regenerative in situ electrochemical hypochlorination". Scientific Reports, Oct. 2, 2019 (Oct. 2, 2019), vol. 9, 14237, [online] [retrieved on Jul. 7, 2020 (Jul. 7, 2020)]. Retrieved from the Internet: <https://doi.org/10.1038/s41598-019-50600-7>.

Lévesque et al., "An electrochemical Advanced Oxidation Process (EAOP) for the Inactivation of Rhizoctonia solani in Fertigation Solutions". Canadian Journal of Plant Science, Feb. 28, 2020 (Feb. 28, 2020), [online] [retrieved on Jul. 7, 2020 (Jul. 7, 2020)]. Retrieved from the Internet: <https://doi.org/10.1139/cjps-2019-0241>.

Lévesque et al., "Electrochemical advanced oxidation process (EAOP) system efficacy in managing greenhouse pathogens Fusarium oxysporum and Rhizoctonia solani". Ontario Pest Management Conference, Nov. 2, 2017 (Nov. 2, 2017), [online] [retrieved on Jul. 7, 2020)]. Retrieved from the Internet: <https://www.opmconference.ca/programs/2017_OPMC_Program.pdf>.

Serge Lévesque, "The Research Seminar Presentation by Serge Levesque" University of Guelph School of Environmental Sciences, Mar. 6, 2018 (Mar. 6, 2018), [online] [retrieved on Jul. 7, 2020)]. Retrieved from the Internet: <https://ses.uoguelph.ca/sites/default/filters/Serge%20Levesque%20ENVS6900%20Seminar%20announcement.pdf>.

Lévesque et al., "Inactiviation of Rhizoctonia solani in irrigation water using regenerative in situ electrochemical hypochlorination". Ontario Pest Management Conference, Nov. 6, 2018 (Nov. 6, 2018), [online] [retrieved on Jul. 7, 2020 (Jul. 7, 2020)]. Retrieved from the Internet: <https://www.opmconference.ca/posters/2018OPMCProgramFinalOct11.pdf>.

Lévesque et al. "Pathogen Inactivation by Electrochemical Disinfection for Recirculating Hydroponic Irrigation Systems". Ontario fruits and vegetables conference, Feb. 20, 2019 (Feb. 20, 2019), [online] [retrieved on Jul. 7, 2020 (Jul. 7, 2020)]. Retrieved from the Internet: <https://www.researchgate.net/profile/Serge_Levesque/publications/336981421_Pathogen_Inactivation_by_Electrochemical_Disinfection_for_Recirculating_Hydroponic_Irrigation_Systems_links/5dbd9201/a6fdcc2128fd5f17/Pathogen-Inactivation-by-Electrochemical-Disinfection-forRecirculating-Hydroponic-Irrigation-Systems.pdf>.

Lévesque et al., "Controlling Pathogens and Chemical Contaminants in Greenhouse Irrigation Water through Electrochemical Processes". Rural Review Ontario Rural Planning Development, and Policy, Mar. 13, 2019 (Mar. 13, 2019), vol. 3 (1), [online] [retrieved on Jul. 7, 2020 (Jul. 7, 2020)]. Retrieved from the Internet: <https://doi.org/10.21083/ruralreview.v3il.6010>.

International Search Report for PCT/CA2020/050634 dated Aug. 4, 2020 (5 pgs.).

* cited by examiner

Figure 1

TREATMENT OF FERTIGATION WATER

RELATED APPLICATIONS

This application claims benefit of priority from U.S. Provisional Application Ser. No. 62/845,302 filed May 8, 2019 the contents of which is hereby incorporated by reference in its entirety.

FIELD

The present disclosure generally relates to the field of water treatment. More particularly, but not limited to, the electrochemical treatment of fertigation water used in agricultural systems and in aspects, controlled environment agricultural systems. The disclosure is inclusive of methods of use of electrochemically treated fertigation water.

BACKGROUND

Controlled Environment Agriculture ("CEA") is an agricultural technology that enables the grower to manipulate a crop's environment to desired conditions for more sustainable food production allowing for the production of crops year-round. Controlled conditions may include light, carbon dioxide, temperature, humidity, water, pH levels and nutrients. CEA includes for example greenhouse, hydroponics, aquaculture, and aquaponics and can be used both for food crops and non-food crops. As used for food crops, CEA complements industrial-scale field agriculture.

CEA is advantageous as it allows for local food production in a variety of environments on a year round basis in an energy efficient manner and eliminates the use of harmful pesticides. CEA may also be used by researchers to isolate specific plants and study their production in a maintained setting to obtain data for scientific study.

Fertigation is a process in which fertilizer is dissolved and distributed via the irrigation water ("fertigation water" or "fertigation solution") and is used in conjunction with CEA. Fertigation water may be re-used; however, the capture and re-use of fertigation water is associated with the threat of pathogen distribution and proliferation resulting from the use of contaminated solutions, and may further involve the accumulation of phytotoxic chemical contaminants under a fertigation water recycling protocol. Nutrient imbalances may also occur in recirculated fertigation water.

Current technologies to address water quality concerns in CEA include filtration, heat, ultraviolet radiation, ozone, hydrogen peroxide and chlorination, with each having drawbacks.

Traditional chlorination requires continuous addition of free chlorine to maintain disinfection targets which presents problems in terms of: cost, both in terms of free chlorine as well as the handling/management systems (e.g., metering pumps/injectors); worker safety as handling chlorine-based disinfectants can be hazardous, particularly for systems using chlorine gas as the primary chemical species; and the inevitable accumulation of chloride in the recycling fertigation solution caused by the continuous addition of free chlorine. As free chlorine participates in various reactions it often reverts to its chloride salt form (e.g., NaCl or KCl) that can accumulate in the solution and reach toxic concentrations under continuous dosing, ultimately requiring the grower to dump their fertigation solutions.

Furthermore, for the inactivation of certain pathogens, high initial free chlorine dosing levels and/or prolonged contact times are required. Thus, traditional chlorine dosing systems need to maintain free chlorine residuals that can exceed the phytotoxic threshold of the crop(s). In these systems, once the free chlorine is consumed more needs to be added to maintain the reactions with the pathogen (or chemical contaminant). In single dose systems, even higher initial concentrations are needed to ensure there is sufficient free chlorine to allow complete inactivation. In either type of system, the levels of free chlorine are inconsistent and difficult to monitor and maintain at safe crop levels.

Free chlorine residuals in solutions being applied to crops need to be tightly monitored and controlled as the phytotoxic thresholds for free chlorine can be quite low (~2.5 mg/L) for some crops. Often the residual needed to achieve pathogen inactivation is well beyond this threshold (e.g. 10-15 mg/L). In such a situation the free chlorine needs to be removed or given sufficient time to degrade, both of which represent an additional treatment cost.

There remains a need for delivering crop security for CEA operators recycling their fertigation water through the effective management of potential pathogen threats as well as select chemical contaminant control. There also is a need for more effective utilization of nutrients within the fertigation water for crop growth.

The discussion of the background herein is included to explain the context of the inventions described herein. This is not to be taken as an admission that any of the material referred to was published, known, or part of the common general knowledge as of the priority date of any of the claims.

SUMMARY

The invention in aspects provides novel and effective methods and systems that can be deployed in isolation or as part of an integrated water management system in CEA operations utilizing fertigation water (i.e. fertigation) to provide source water treatment to ensure crop security. Encompassed are both single pass (initially treated) fertigation water and recycled (captured, re-used and retreated) fertigation water to provide a safe source of fertigation water to ensure crop security. Encompassed are both single pass fertigation irrigation systems and recycled (captured and re-used) fertigation irrigation systems to provide source fertigation water treatment to ensure crop security. The methods and systems also help to conserve water as the fertigation water is recycled for re-use as part of a water management system.

The methods of the invention are capable of efficiently meeting the nutritional needs of crops while at the same time providing a regenerating level of disinfectant for controlling growth of pathogens in the fertigation water that may be harmful to crops without negative accumulation of disinfectant. Treated effluent fertigation water contains disinfectant below phytotoxic levels.

The method is surprisingly stable and effective for providing crop security against pathogens, that is, disinfect the fertigation water from pathogens harmful to crops, while simultaneously preventing the accumulation of chemical contaminants which is also harmful to crops. In the method, a level of disinfectant is provided and continuously regenerated and controlled to manage pathogen inactivation while simultaneously the levels of phytotoxic chemical contaminants are managed to fall below a phytotoxic crop level. Further, nutrient levels of the treated fertigation water remain substantially unchanged. In an aspect, the method provides for increases in some essential ions serving as an enrichment of the fertigation water for improving growth conditions for crops.

In aspects, the method incorporates electrochemistry to continuously regenerate one or more disinfection agent(s) in the fertigation water in an effective amount to control pathogens while simultaneously preventing the accumulation of the one or more disinfection agent(s) to toxic levels for a crop.

In further aspects, the method incorporates electrochemistry to continuously regenerate a disinfection agent in the fertigation water in an effective amount to control pathogens while simultaneously preventing the accumulation of the disinfection agent to toxic levels for a crop, and further enriches nutrients (e.g. nitrogen containing) in the fertigation water during treatment thereof.

In one non-limiting embodiment of the invention, is an electrochemical method that continuously regenerates a disinfectant, in one aspect free chlorine, in an amount effective to inactivate chloride sensitive pathogens thus advantageously negating the need to continually add or add any additional chloride salts to sustain disinfection reactions in the fertigation water. The method further prevents free chlorine accumulation, the active or disinfecting form of chlorine, due to the advantageous composition of the fertigation water providing a secondary sink for the free chlorine that is predominated by the pathogen inactivation mechanisms.

In the present method the chloride concentration remains stable during treatment of the fertigation water and thus effluent free chlorine concentrations remain below phytotoxic thresholds (e.g. about 2.5 mg/L), demonstrating that the present in situ electrochemical hypochlorination method continues to regenerate free chlorine while conserving chloride. In aspects, this is a regenerative in situ hypochlorination method for the control of chlorine sensitive pathogens in fertigation water suitable for use in commercial CEA. In one embodiment, the system incorporates the use of dimensionally stable anodes (DSAs) such as, but not limited to $RuO_2$.

Advantageously, the method also allows for nutrients contained in the fertigation water to be conserved. Macronutrient ions are substantially unaffected. The loss of total nitrogen levels is limited and may be controlled by pH adjustment of the fertigation water during treatment.

In a further non-limiting embodiment of the invention, the continuously regenerated disinfectant is a combination of reactive oxygen species (ROS) such as $O_2$, $O_3$, $H_2O_2$ and $OH^\bullet$. In this embodiment, the system incorporates the use of boron doped diamond electrodes (BDD) to continuously produce reactive oxygen species. In aspects, this is a regenerative in situ oxidant generating method for the control of oxidant-susceptible pathogens in fertigation water in commercial CEA. Advantageously, any chlorate species formed (typically <2 ug/L) are below acceptable levels (e.g. below 2 mg/L).

In this embodiment incorporating the use of BDD, nutrients contained in the fertigation water are also conserved. The loss of total nitrogen levels is limited and may be controlled by pH adjustment of the fertigation water during treatment. Advantageously, organic components of the fertilizer or other organic contaminants in the fertigation water are degraded releasing ammonium, nitrate, sulphate and calcium that enrich the fertigation water for improving the growth conditions for crops. As such in a further aspect, the invention incorporates electrochemistry to advantageously increase nutrient availability within the fertigation water for crop growth. Electrochemical mineralization of the fertigation water degrades organic matter therein containing nitrogen, e.g., proteins and nucleic acids, to release ammonia/ammonium that is oxidized to nitrate ions essential for crop growth. This enriches the fertigation water as it is being treated since the released ammonium ions and nitrate become available for crop growth.

In further aspects using BDD, additional chloride may be added that is also regenerated without a build-up of free chlorine while maintaining acceptable low chloride effluent levels in the treated fertigation water. In this aspect, a combination of oxidative species and free chlorine are regenerated at disinfecting amounts that may target the same or different pathogens in the fertigation water, while still maintaining safe levels of chlorine and safe levels of chlorate. Thus effluent free chlorine and chlorate species concentrations remain below phytotoxic thresholds.

The regenerative in situ electrochemical methods of the invention can be used to effectively inactivate any chloride-susceptible and/or oxidant-susceptible crop (plant) pathogens which may generally include fungi, bacteria, viruses, oomycetes and mycoplasmas. In non-limiting aspects, the methods of the invention may be used to effectively inactivate pathogens of the genus *Rhizoctonia* (a genus of anamorphic fungi) or *Fusarium* (a genus of mold, a representative non-limiting example is *Fusarium oxysporum*). In aspects, the species is *Rhizoctonia solani*.

Fertigation water for treatment in accordance with the invention may comprise inorganic and/or organic fertilizer. The fertigation water may be treated, then used to irrigate crops. Treated fertigation water used to irrigate crops may be collected (for example the run off collected) and pooled for retreatment and re-use. Untreated fertigation water may also be mixed with treated fertigation water for treatment.

Effective pathogen inactivation in aspects of the methods is achieved by maintaining a low concentration of chloride (concentration of chloride in fertigation water) and adjusting one or more of: current density, residence time (flow rate) and pH in relation to the free chlorine demand. Effluent free chlorine concentration remains below phytotoxic thresholds. Chloride concentrations remain stable throughout the treatment of the fertigation water. Macronutrient content of the fertigation water remains substantially unaltered.

In aspects of the invention, the pH of the fertigation water during treatment is at least about 5.4. In further aspects, the pH is between about 5.4 to about 8.5. In further aspects, the pH is about 5.5 to 6.5, this pH is favourable for chloride and nitrogen species therein. In any of these ranges, all integers are included.

In aspects of the invention, the current density used in the methods is at least about $0.76$ mA/cm². In further aspects the current density is about $0.76$ mA/cm² to about $9.09$ mA/cm². In further aspects, the current density is at least about $1.14$ mA/cm², at least about $2.27$ mA/cm², at least about $3.41$ mA/cm², at least about $4.55$ mA/cm² at least about $6.82$ mA/cm² and at least about $9.09$ mA/cm². One of skill in the art may recognize that in particular aspects, higher current densities may be applied for different periods of time or combinations of current densities may be used for different periods of time, or a gradual increase and/or decrease of current density over time may be used.

In aspects of the invention the residence time may be up to about 1 minute, up to about 2 minutes, up to about 3 minutes, up to about 4 minutes, up to about 5 minutes, up to about 6 minutes, up to about 7 minutes, up to about 8 minutes, up to about 9 minutes, or up to about 10 minutes.

All time periods within these ranges is included. In certain aspects longer residence times may be desired.

In aspects of the invention the methods are conducted under ambient light at room temperatures. It is understood however, that lighting and temperatures may be further adjusted.

In aspects, the effective current density range for use in the method for treating fertigation water varies with contact times. In non-limiting aspects it may be about 0.76 to about 2.27 mA/cm$^2$, or about 0.76 to about 9.09 mA/cm$^2$, or about 0.76 to about 1.14 mA/cm$^2$ inclusive of any subranges within these ranges as understood by one of skill in the art.

In accordance with an aspect of the invention is an in situ hypochlorination method for the treatment of fertigation water, comprising:
continuously regenerating a disinfection agent in an effective amount to control a pathogen in said fertigation water;
simultaneously preventing the accumulation of the disinfection agent in said fertigation water to toxic levels for a crop; and optionally
biodegrading nitrogen containing matter in said fertigation water to release ammonium ions for nitrification.

In accordance with another aspect, is an in situ oxidant producing method for the treatment of fertigation water, comprising:
continuously regenerating oxidative species in an effective amount to control a pathogen in said fertigation water, and optionally
degrading nitrogen containing matter in said fertigation water to release ammonium ions and nitrate.

In aspects, methods of the invention are achieved through the use of an electrochemical flow cell (EFC) that is outfitted with dimensionally stable anodes (DSA), in aspects ruthenium dioxide ($RuO_2$). In the methods, fertigation water is pumped into the EFC, where it contacts and flows through the electrically charged DSAs and exits the EFC for collection. Pathogen inactivation is achieved by regenerative mediated electrolysis, whereby chloride ions in the flowing fertigation water are transformed to free chlorine forms (e.g. hypochlorous acid) that neutralizes pathogens while simultaneously releasing chloride ions back to the solution where the chloride ions migrate back to the anode through electrostatic migration where again, the chloride ions can be transformed to hypochlorous acid for pathogen neutralization.

In further aspects, methods of the invention are achieved through the use of an electrochemical flow cell (EFC) that is outfitted with BDD anodes. In the methods, fertigation water is pumped into the EFC, where it contacts and flows through the electrically charged BDDs and exits the EFC for collection. Pathogen inactivation is achieved by regenerative mediated electrolysis, whereby oxidants are generated in situ (a combination of reactive oxygen species (ROS) such as $O_2$, $O_3$, $H_2O_2$ and $OH^{\cdot}$) that neutralizes pathogens by attacking pathogens membrane, DNA, and other essential components needed for its survival. The treated fertigation water is chemically decomposed from recalcitrant organic pollutants. Optionally, chlorine may be added that is also regenerated with stable chloride levels being maintained and safe free chlorine levels.

Overall the electrochemical fertigation water treatment methods involve the capture and transfer of the fertigation water to an electrochemical treatment unit comprising one or more EFC. Further the fertigation water is pumped into and passes through the electrochemical flow cell. In this step, direct electrical current is applied and the rate of flow is adjusted to achieve a desired level of fertigation water treatment based on the concentration of the pathogen to be inactivated or contaminants to be removed. Hydraulic residence time within the electrochemical flow cell is in a range of at least about 15 seconds to about 10 minutes or more, depending on the concentration of the pathogens to be inactivated. The treated fertigation water effluent may optionally be passed through either a clarifier or filter for removal of any precipitated solid particles that may be present in the treated fertigation water.

Broadly presented, systems of the invention include providing a flow-through EFC including a cathode and an anode, wherein the anode is selected from DSA or BDD. The systems further include a power source connected to the cathode and the anode, a pump for passing a fertigation water through the flow-through EFC, and withdrawing the treated fertigation water from the EFC. The fertigation water thus treated is used to irrigate crops in a CEA technology, the runoff collected, and recycled back into the flow-through EFC system.

In aspects is a method for the treatment of fertigation water to control plant pathogens and degrade chemical contaminants.

In aspects is electrochemically treated fertigation water comprising stable chloride levels and effective levels of free chlorine as a disinfectant to control plant pathogens and stable macronutrient levels.

In aspects is electrochemically treated fertigation water comprising stable levels of oxidative species as a disinfectant to control plant pathogens, increased nutrient levels and safe chlorate species levels.

In aspects is electrochemically treated fertigation water comprising stable levels of oxidative species and free chloride as disinfectants to control plant pathogens, increased nutrient levels, stable chloride levels and safe chlorate species levels.

In further aspects is a method for the treatment of fertigation water to control plant pathogens and degrade chemical contaminants, the method comprising regenerating a disinfection agent while simultaneously preventing accumulation of the disinfection agent at toxic levels to crops.

In aspects, electrochemical systems are provided for effectively controlling pathogens via in situ regenerative hypochlorination.

In aspects, electrochemical systems are provided for effectively controlling pathogens via in situ regenerative generation of reactive oxygenated species.

The methods and systems of the invention are flexible and scalable to desired system sizes. Disinfection targets are achieved through the manipulation of parameters (current density, flow rate/contact time, chloride concentration, electrode area (scaling factor)).

The methods and systems of the invention are versatile, technologically effective, and cost-effective for the treatment of fertigation water using a flow-through EFC that utilizes DSA or BDD anodes.

In a further aspect the present invention provides a method of controlling plant pathogens, comprising applying treated fertigation water (treated fertigation water effluent) as described herein to a plant, or to a plant susceptible to attack by a plant pathogen in a CEA system.

According to an aspect of the invention is an irrigation system comprising:
one or more electrically-driven electrochemical flow cell (EFC) fluidly connected to a source of fertigation water to be treated; and an irrigation water distribution system fluidly connected to the one or more electrically-driven EFC.

According to an aspect of the invention is a system for removing contaminants from fertigation water, the system including at least one electrochemical flow cell comprising:
- a housing having an inlet for untreated fertigation water and an outlet for treated fertigation water that has been treated within the housing;
- an array of spaced apart electrodes within the housing;
- a source for applying direct current the electrodes to charge one portion of the array positively and another portion of the array negatively so as to create an electrical gradient between the portions of the array, the direct current being sufficient to oxidize and to neutralize small particle surface charges in an aqueous solution, and
- container structure adjacent the housing, the container structure having an inlet chamber and an outlet chamber, the inlet chamber accumulating untreated water and delivering the untreated water to the inlet of the housing, an outlet of the housing being connected to the outlet chamber of the container and an outlet line being connected to the outlet chamber to drain away the treated water.

According to an aspect of the invention is a treated fertigation water composition that is crop secure.

According to a further aspect of the invention is the use of a treated fertigation water composition for irrigation of crops in a crop secure manner.

Clauses:

In certain aspects, also disclosed is an electrochemical method for the treatment of fertigation water, including: flowing fertigation water through an electrochemical cell to effect regenerative mediate electrolysis, the electrochemical cell comprising at least one anode and at least one complementary cathode while simultaneously adjusting one or more of current density, flow rate and pH, wherein said flowing of said fertigation water continuously regenerates a disinfection agent in an effective amount to control a pathogen in said fertigation water; and collecting effluent treated fertigation water, wherein the disinfection agent is not accumulated in said effluent treated fertigation water to toxic levels for a crop.

In certain aspects, the at least one anode is a dimensionally stable anode.

In certain aspects, the dimensionally stable anode is ruthenium dioxide.

In certain aspects, the disinfecting agent is a free chlorine form.

In certain aspects, the chloride ions in the flowing fertigation water are transformed to hypochlorous acid that neutralizes said pathogen while simultaneously releasing chloride ions back to the fertigation water where the chloride ions migrate back to the at least one anode through electrostatic migration where again, the chloride ions are transformed to hypochlorous acid for neutralizing said pathogen.

In certain aspects, the free chlorine concentrations remain below phytotoxic thresholds of about 2.5 mg/L in said effluent treated fertigation water.

In certain aspects, the chloride concentrations remain stable throughout the treatment of the fertigation water.

In certain aspects, the macronutrient content of the fertigation water remains substantially unaltered.

In certain aspects, the current density is at least about 0.76 $mA/cm^2$.

In certain aspects, the current density is about 0.76 $mA/cm^2$ to about 9.09 $mA/cm^2$.

In certain aspects, the current density is about 1.14 $mA/cm^2$, about 2.27 $mA/cm^2$, about 3.41 $mA/cm^2$, about 4.55 $mA/cm^2$, about 6.82 $mA/cm^2$ or about 9.09 $mA/cm^2$.

In certain aspects, the pH of the fertigation water during treatment is at least about 5.4.

In certain aspects, the pH is between about 5.4 to about 8.5.

In certain aspects, the pH is about 5.5 to 6.5.

In certain aspects, the pH is selected to be favourable for chloride and nitrogen species in said fertigation water.

In certain aspects, the flow rate is selected to provide a residence time of up to about 10 minutes.

In certain aspects, the method is conducted at about room temperature.

In certain aspects, the method is conducted under ambient light.

In certain aspects, the pathogen is a chloride sensitive pathogen.

In certain aspects, the chloride sensitive pathogen is selected from fungi, bacteria, viruses, oomycetes and mycoplasmas.

In certain aspects, the chloride sensitive pathogen is a fungi.

In certain aspects, the chloride sensitive pathogen is a fungi from the genus *Rhizoctonia* or *Fusarium.*

In certain aspects, the chloride sensitive pathogen is *Fusarium oxysporum* or *Rhizoctonia solani.*

In certain aspects, the chloride sensitive pathogen is *Rhizoctonia solani.*

In certain aspects, the method does not require additional chloride salts to sustain disinfection reactions in the fertigation water.

In certain aspects, also disclosed is a controlled environment agricultural system employing using the above methods.

In certain aspects, also disclosed is a method for conserving water in controlled environment agriculture, the method comprising using and re-using treated fertigation water made by the above methods.

In certain aspects, also disclosed is an irrigation system comprising: one or more electrically-driven electrochemical flow cells (EFC) comprising at least one anode and at least one complementary cathode, each of the EFC fluidly connected to a source of fertigation water to be treated; and an irrigation water distribution system fluidly connected to the one or more electrically-driven EFC.

In certain aspects, also disclosed is a treated fertigation water composition that is crop secure.

In certain aspects, also disclosed is an electrochemically treated fertigation water comprising stable chloride levels and effective levels of free chlorine as a disinfectant to control plant pathogens.

In certain aspects, also disclosed is an electrochemically treated fertigation water comprising stable levels of a disinfectant to control plant pathogens and safe chlorate species levels.

In certain aspects, also disclosed is anelectrochemically treated fertigation water comprising stable levels of free chloride as disinfectants to control plant pathogens, stable chloride levels and safe chlorate species levels.

BRIEF DESCRIPTION OF THE DRAWINGS

The above and other aspects, advantages, and features of this disclosure will become more apparent by describing in further detail exemplary embodiments thereof with reference to the accompanying drawings, in which:

Figure 1:
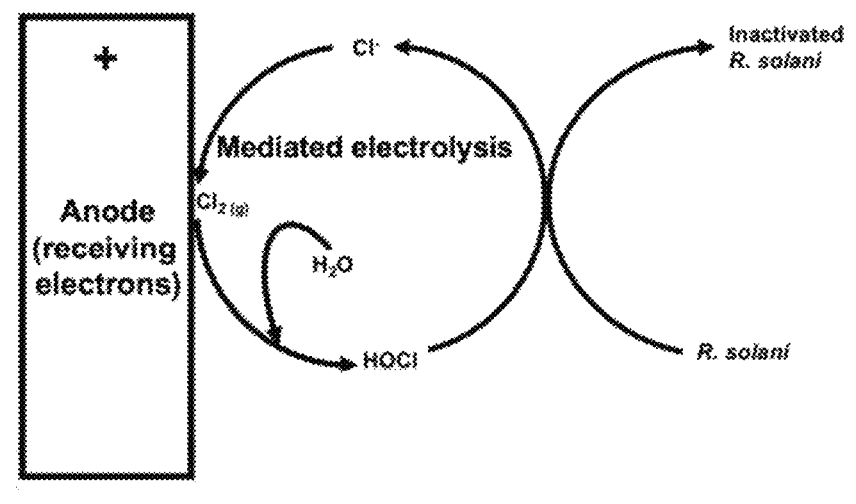

FIG. 1 is a schematic showing proposed mechanisms of pathogen inactivation with an emphasis on the cycle of reactions constituting regenerative in situ electrochemical hypochlorination (mediated electrolysis).

FIG. 2A shows Electrochemical Flow Cell (EFC) testbed schematic showing the principle components and the direction of the electrical current depicted by arrows used for the experimental setup and FIG. 2B showing the EFC with red arrows depicting the flow path and FIG. 2C monitoring and controlling components for flow rate (F), current (A), voltage (V), and the use of the power supply (P).

FIG. 3: Inactivation of Rhizoctonia solani (R. solani) as a function of contact time, while maintaining a constant current density of 0.76 $mA/cm^2$. The test solution only contained deionized water with free floating mycelia and did not contain fertilizer or chloride salts for the experiment. Without the presence of a supporting electrolyte in solution gave an operating voltage for this specific experiment ~32 volts. Error bars are ±SEM, N=3, n=3.

FIG. 4A shows inactivation of Rhizoctonia solani as a function of current density and contact time with 20 mg/L of chloride in solution with no fertilizer present, and FIG. 4B shows effluent free chlorine concentration from the EFC after treatment of Rhizoctonia solani with 20 mg/L of chloride with no fertilizer present. Error bars are ±SEM, N=3, n=3.

FIG. 5: Effluent free chlorine measured from the EFC as a function of current density, contact time, as well as varying the concentration of fertilizer in solution. All of these experiments were conducted with a chloride concentration of 20 mg/L. Error bars are ±SEM, N=3, n=3. Where error bars are not shown they are too small to be visible behind the symbol.

Figure 8A:
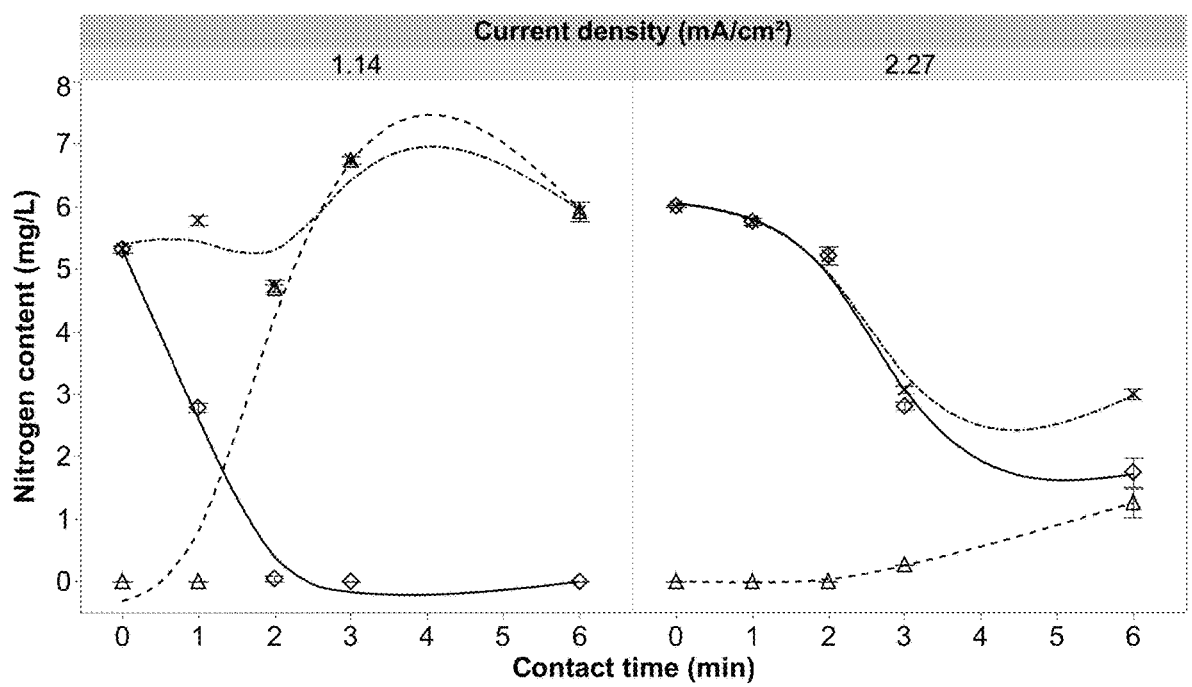
Figure 8B:
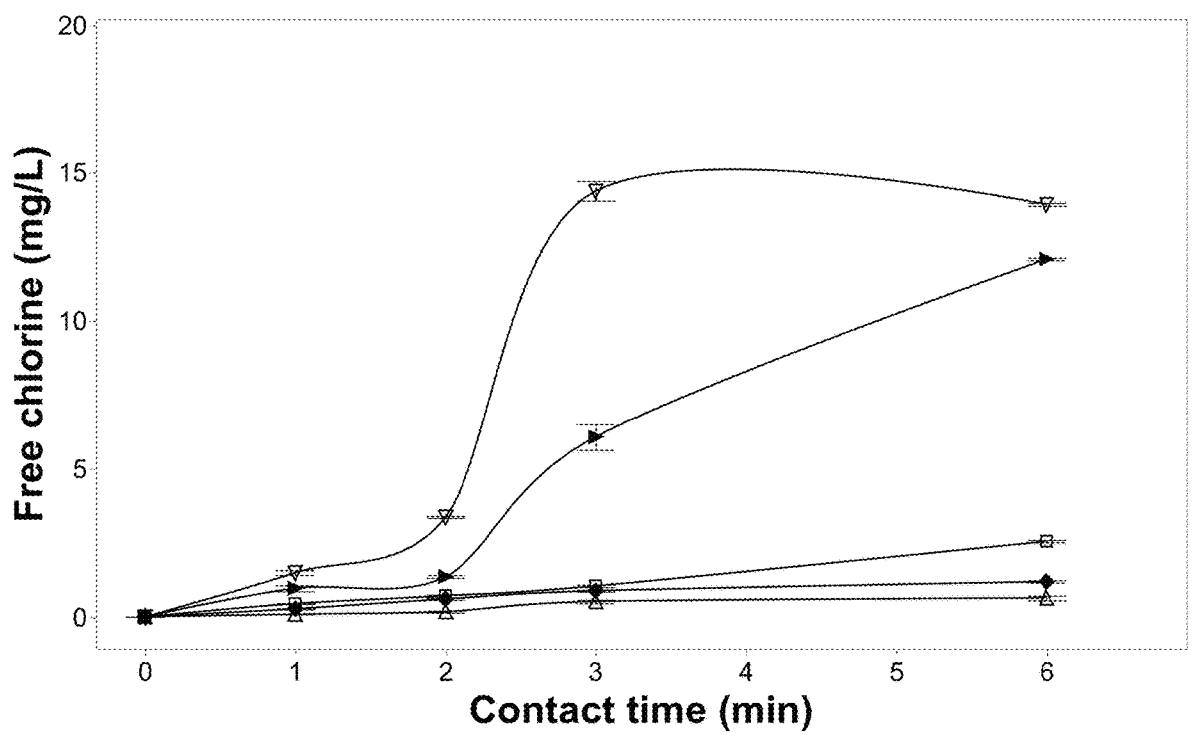

FIG. 8A shows nitrogen dynamics as a function of current density (1.14 & 2.27 $mA/cm^2$) and contact time of the solution containing $(NH_4)_2SO_4$ as the supporting electrolyte (relative to 0.05 g/L of 20-8-20 Plant Prod fertilizer) and 20 mg/L of chloride. FIG. 8B shows effluent free chlorine concentration as a function of current density and contact time. Error bars are ±SEM, N=3, n=3.

Figure 9:
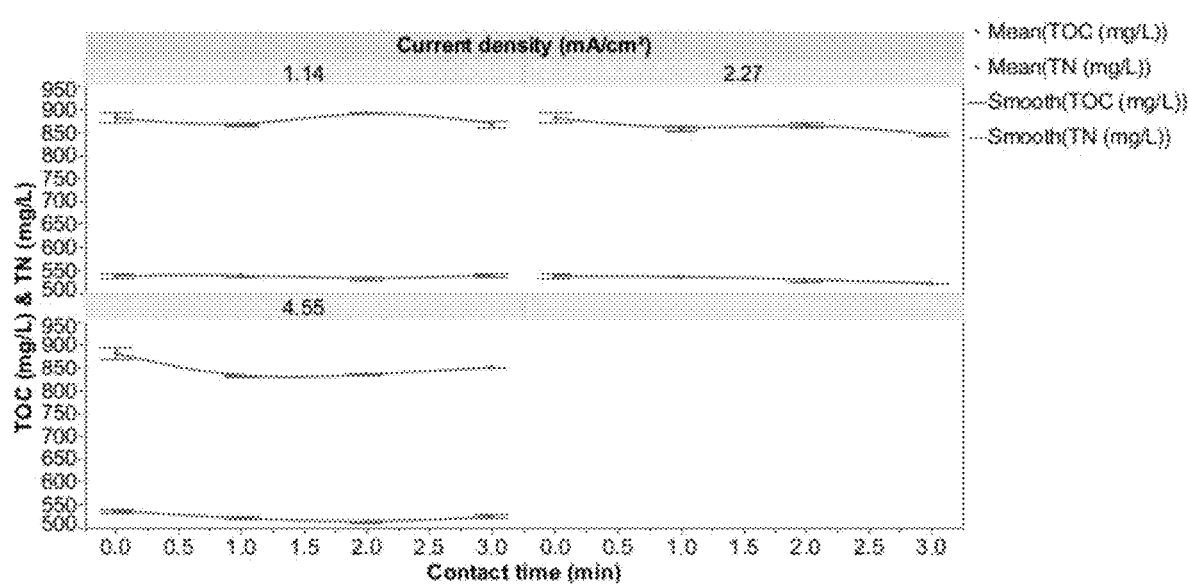

FIG. 9: TOC and TN of the organic fertilizer solution when treated with DSA's.

Figure 10A:
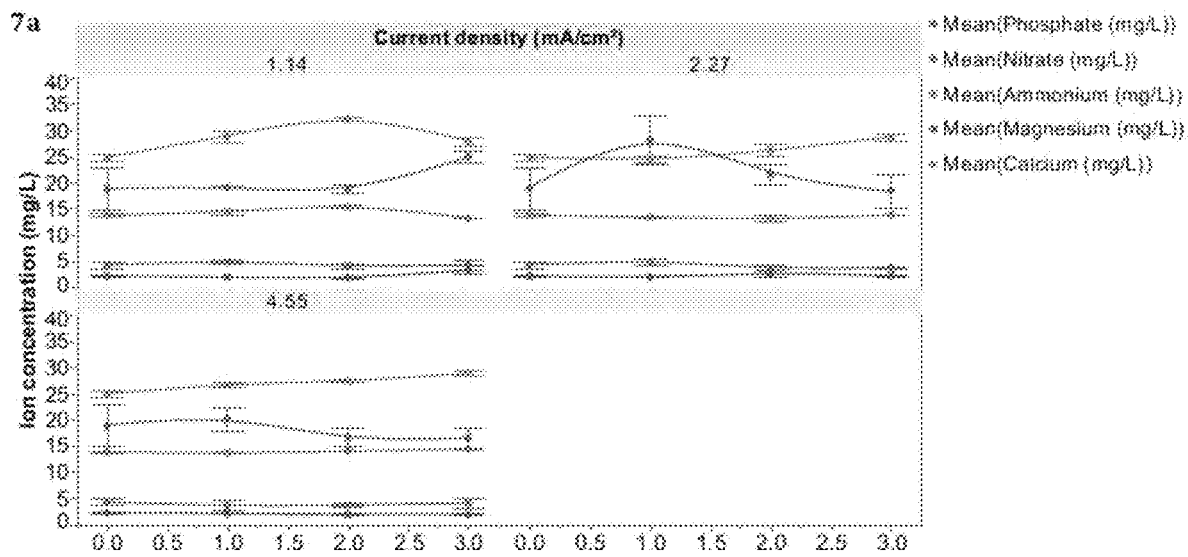
Figure 10B:
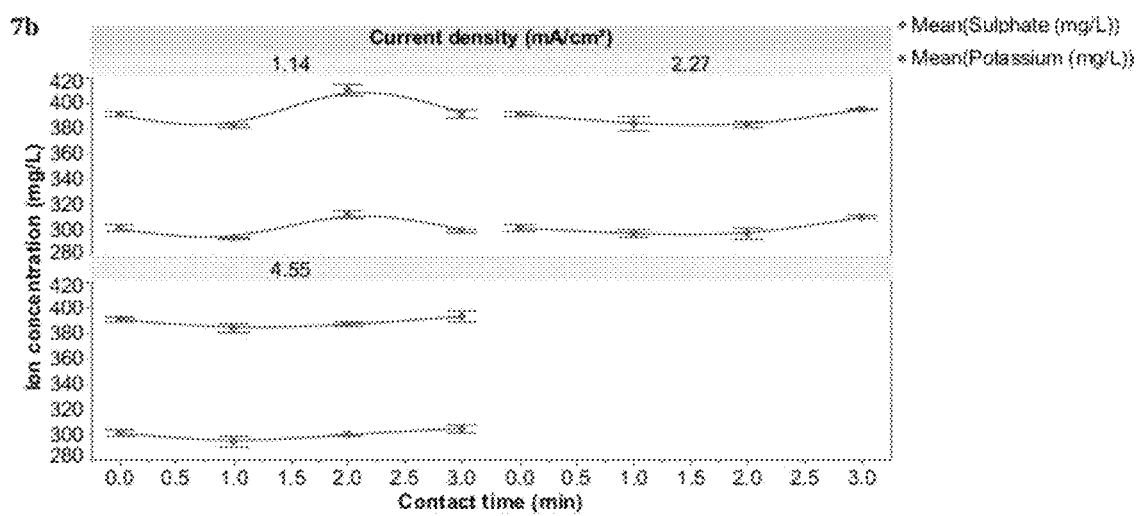

FIGS. 10A and 10B: Concentration of different ions from the organic fertilizer solution when treated with DSA's.

Figure 11A:
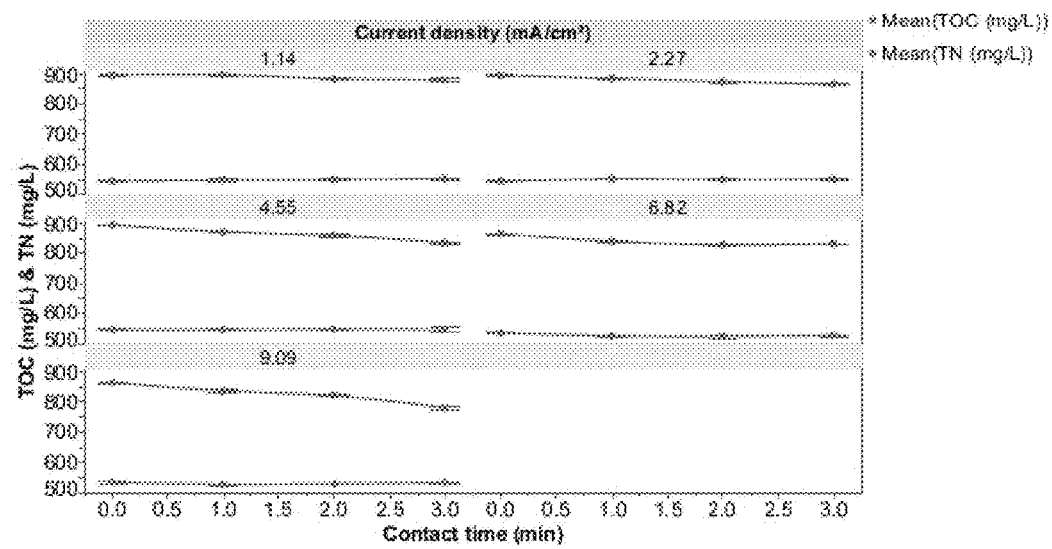
Figure 11B:
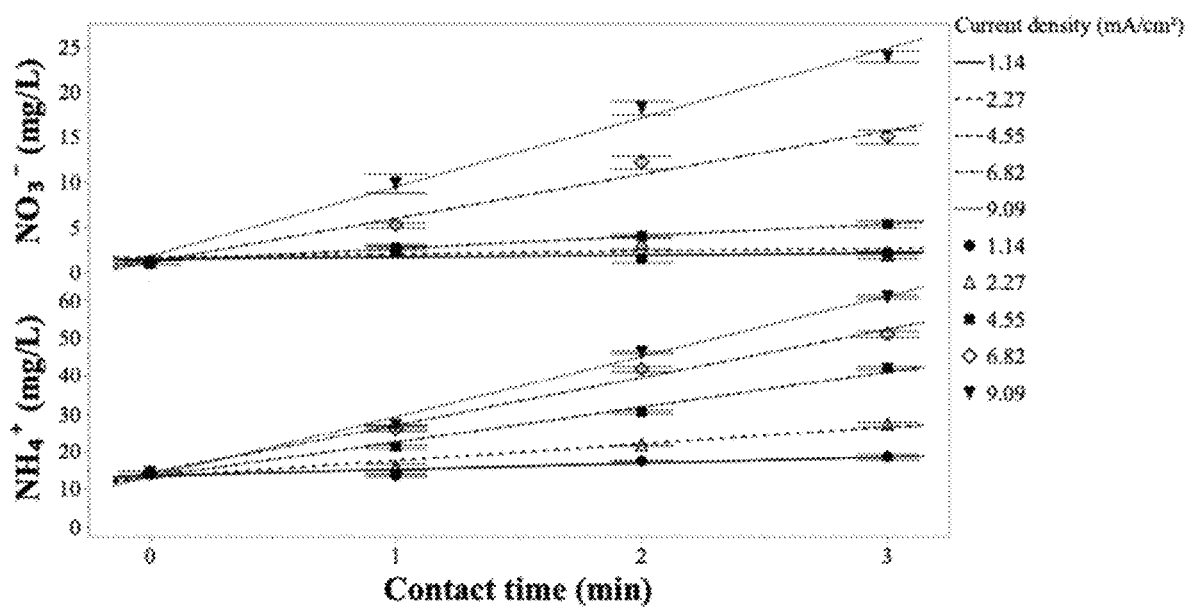
Figure 11C:
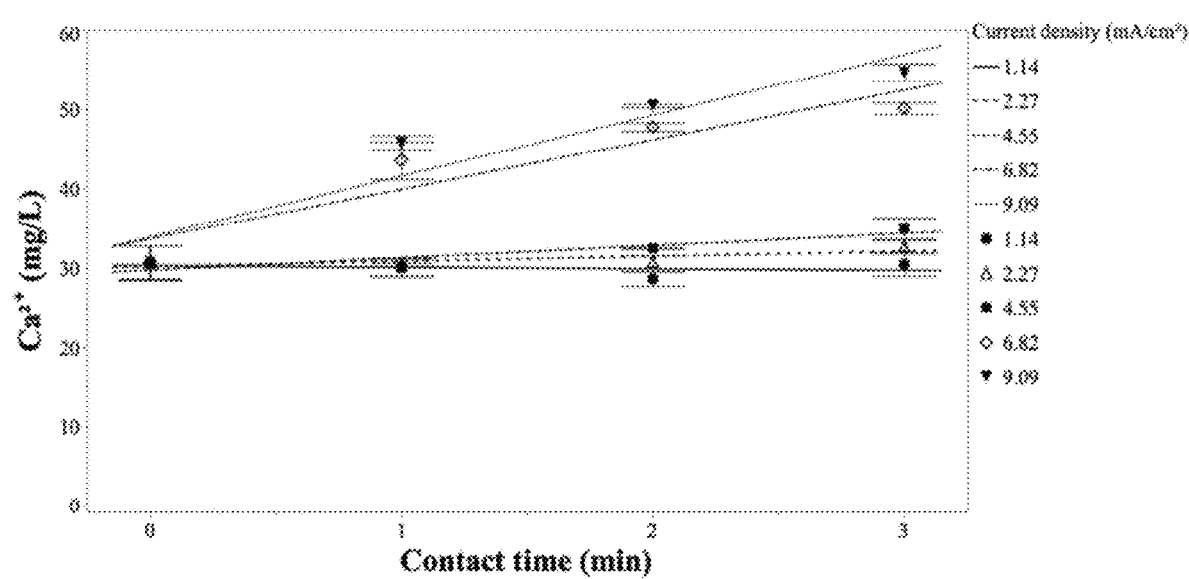

FIGS. 11A, 11B, and 11C: TOC (total organic carbon) and TN (total nitrogen) of the organic fertilizer solution when treated with BDD electrodes.

Figure 12A:
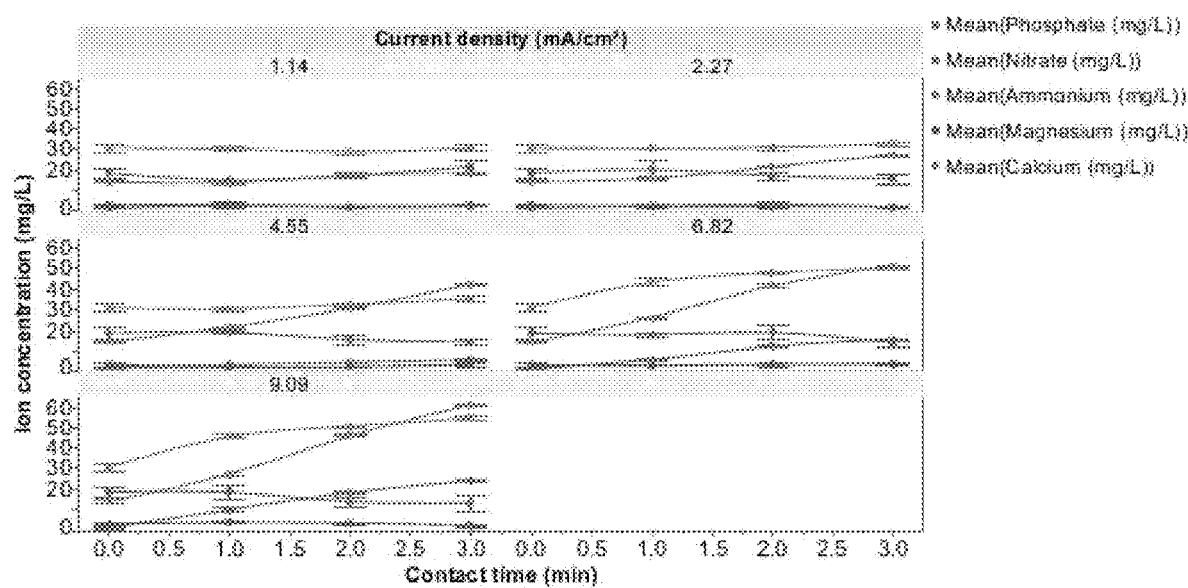
Figure 12B:
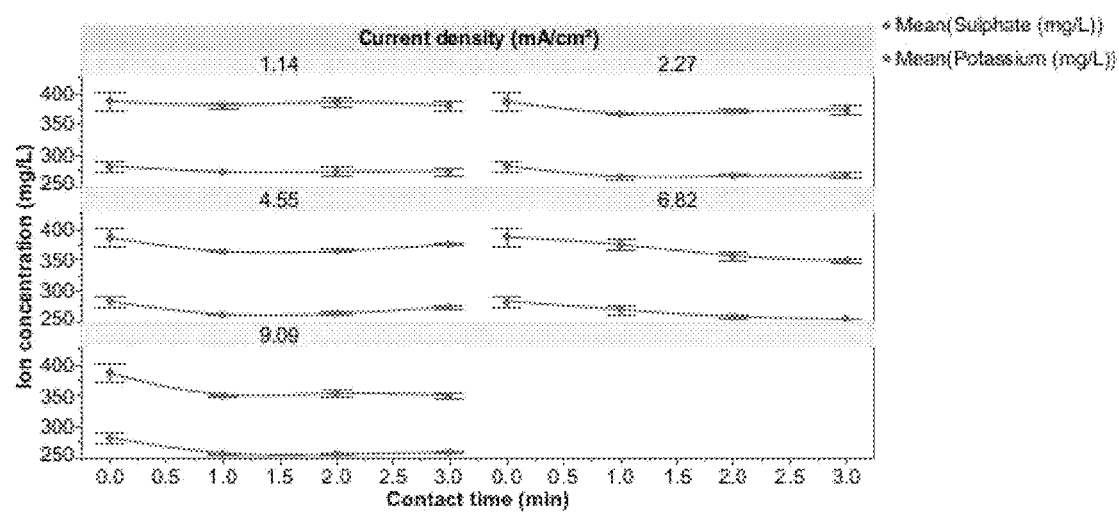

FIGS. 12A and 12B: Concentration of different ions from the organic fertilizer solution when treated with DSA's.

Figure 13A:
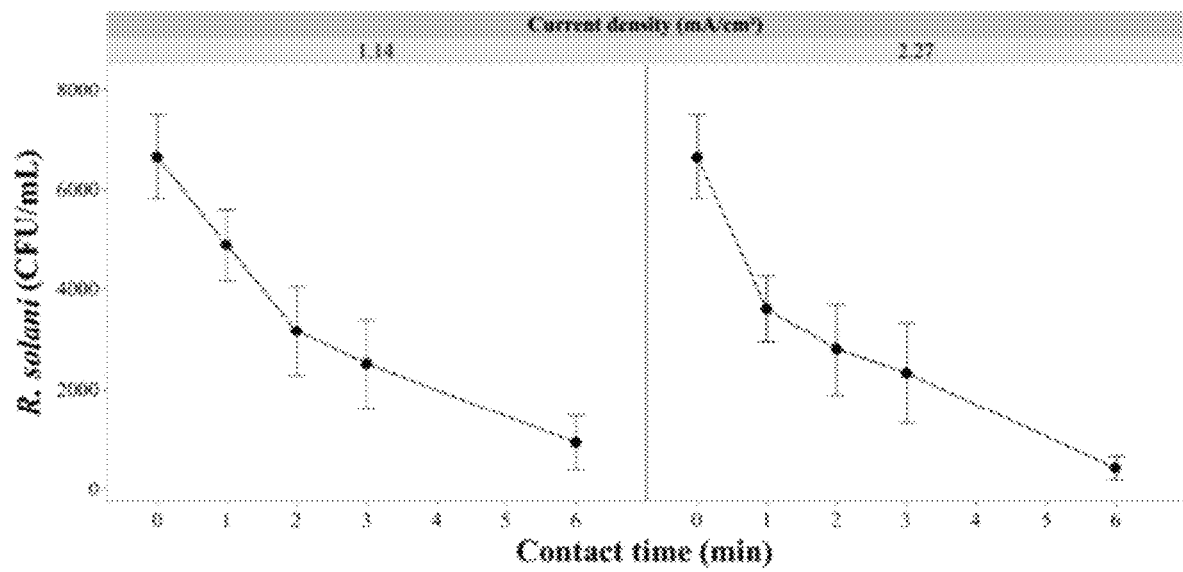
Figure 13B:
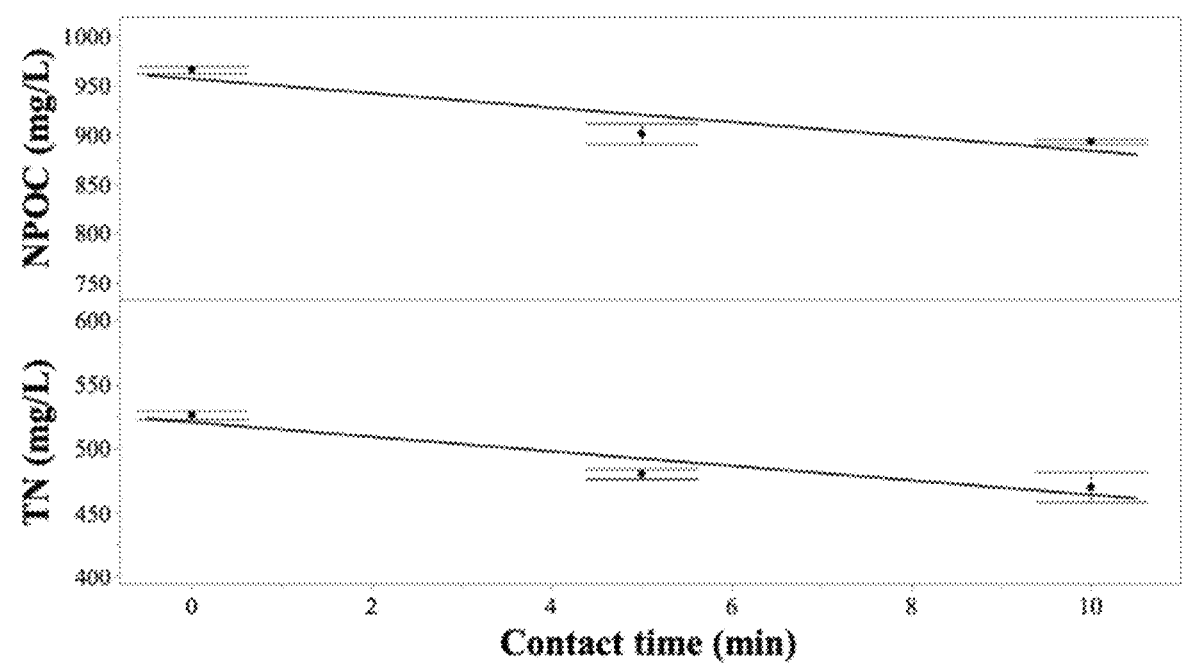
Figure 13C:
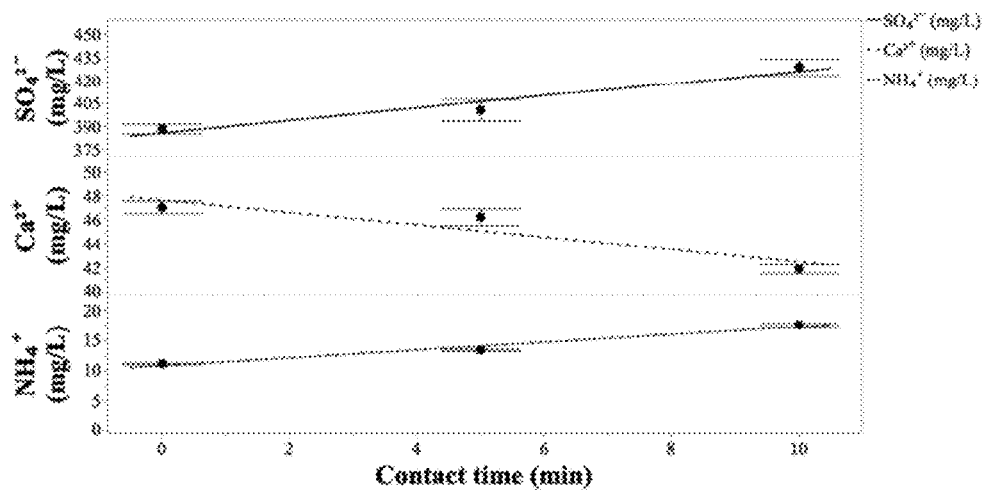
Figure 13D:
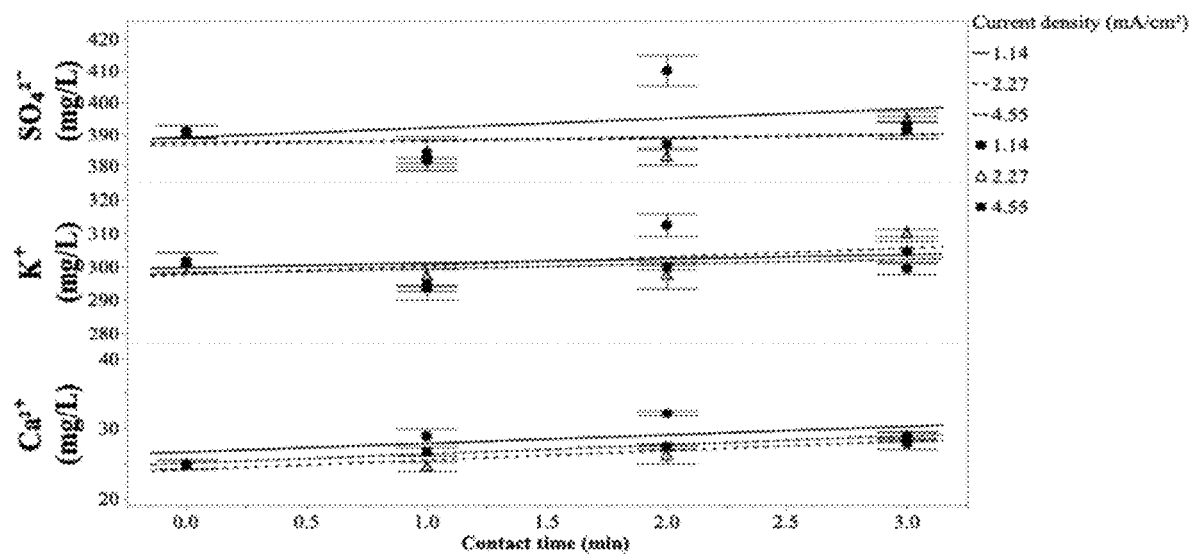

FIG. 13A: Inactivation of R. solani in the absence of both fertilizer or chloride (only pathogen and deionized water present). The solution was passed through the EFC at variable contact times and applied the current densities of 1.14 and 2.27 $mA/cm^2$. Error bars are ±SEM, n=3. FIGS. 13B, 13C, and 13D show levels of TN, nitrate, ammonium, sulphate and calcium with varying contact times.

Figure 14:
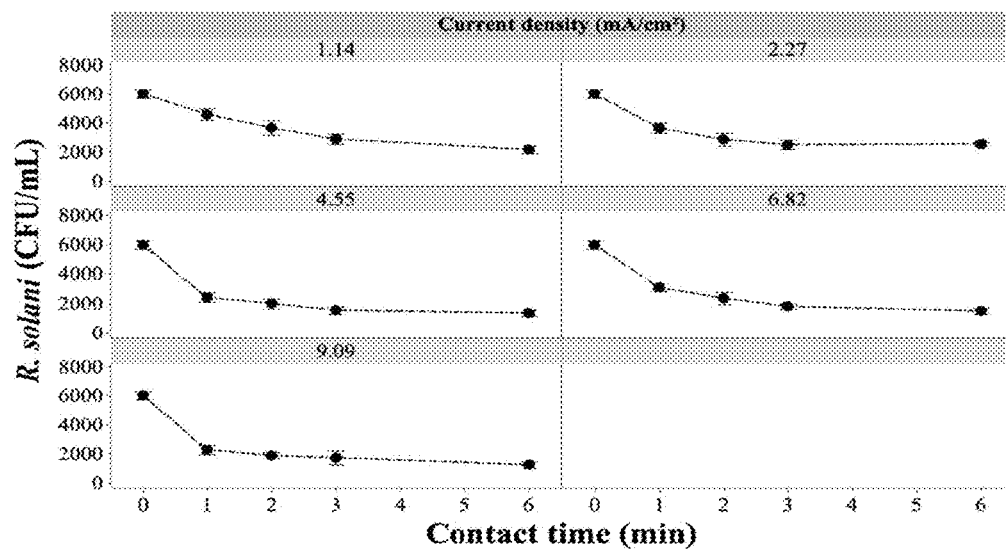

FIG. 14: Inactivation of R. solani with the presence of fertilizer but without the presence of chloride in solution. The solution was passed through the EFC with applying various current densities and contact times to treat the fertigation solution. Error bars are ±SEM, n=3.

Figure 15:
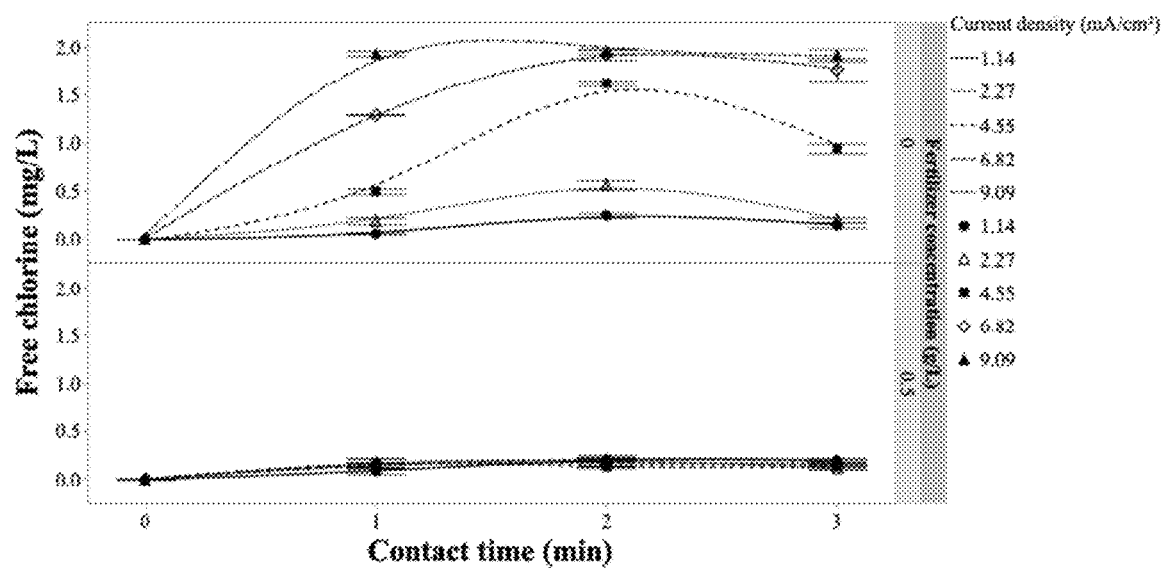

FIG. 15: Effluent-free chlorine concentrations produced by BDD electrodes with and without the presence of fertilizer in solution. The legend in the top right corner depicts the current densities applied to the solution over various contact times. Error bars are ±SEM, n=3.

Figure 16:
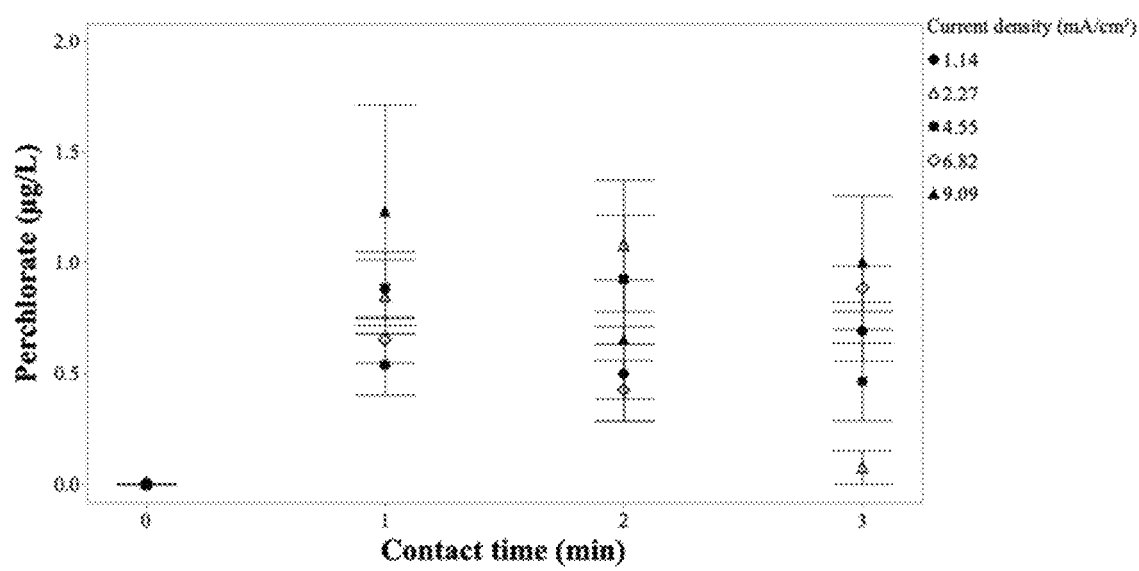

FIG. 16: Perchlorate analysis by spectrophotometric methods with samples collected from the EFC with BDD electrodes. The solution only contained chloride and applied various current densities and contact times of the solution with the electrodes. Error bars are ±SEM, n=3.

Figure 17A:
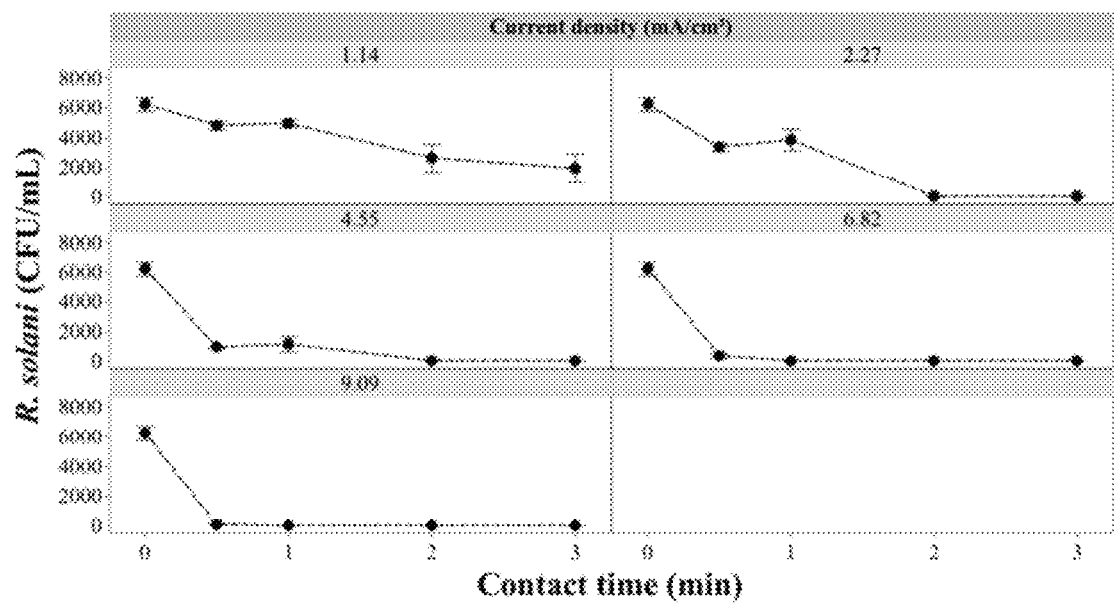
Figure 17B:
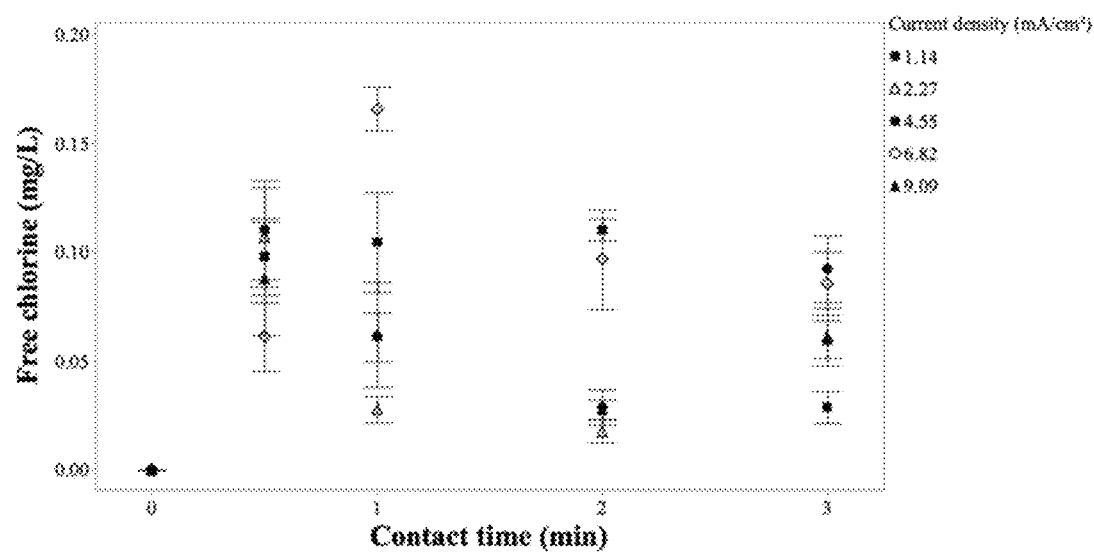

FIG. 17A show the solution contained 20 mg/L of chloride and 0.5 g/L of fertilizer and monitored for the inactivation of R. solani and FIG. 17B shows the free chlorine produced as a function of contact time and current density. Error bars are ±SEM, n=3.

Figure 18:
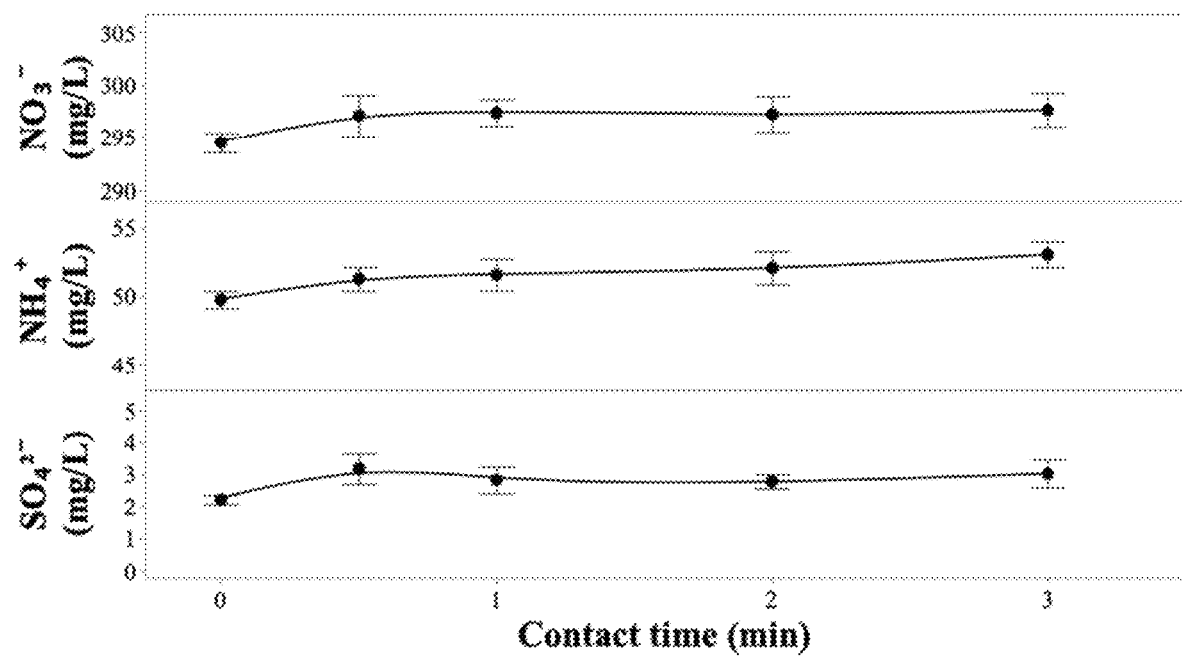

FIG. 18: Concentrations of nitrate, ammonium and sulphate when applying a current density of 9.09 $mA/cm^2$ to the solution with varying contact times. The solution contained both fertilizer and chloride during treatment. Error bars are ±SEM, n=3.

Figure 19A:
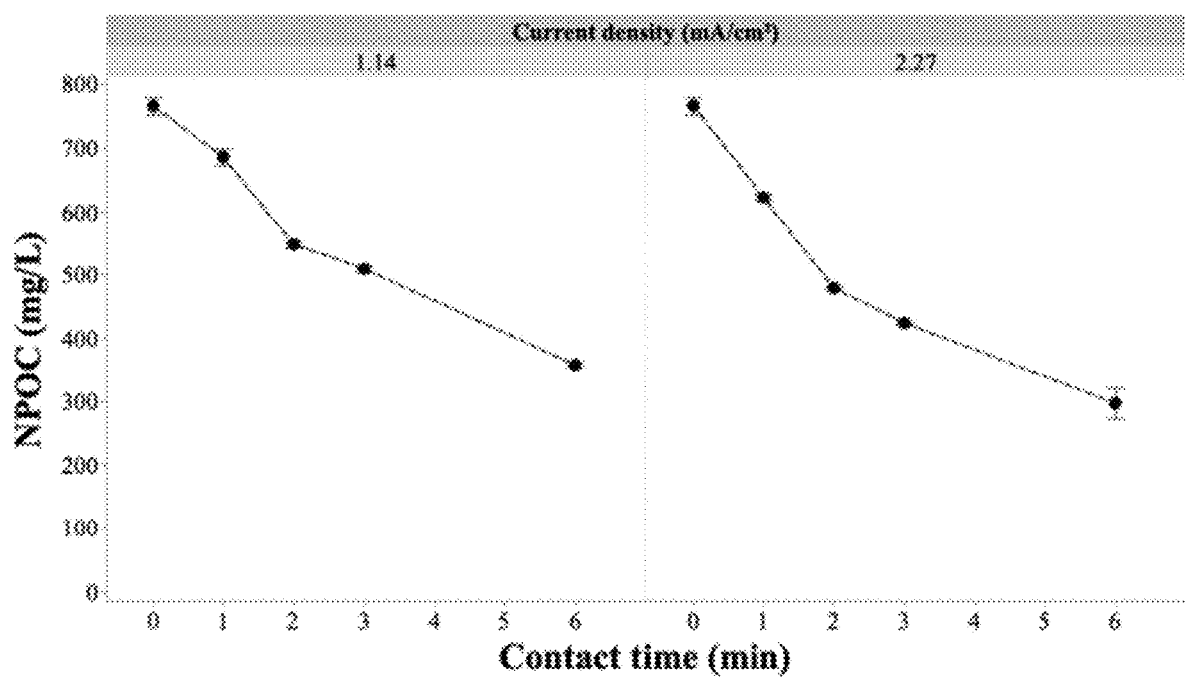
Figure 19B:
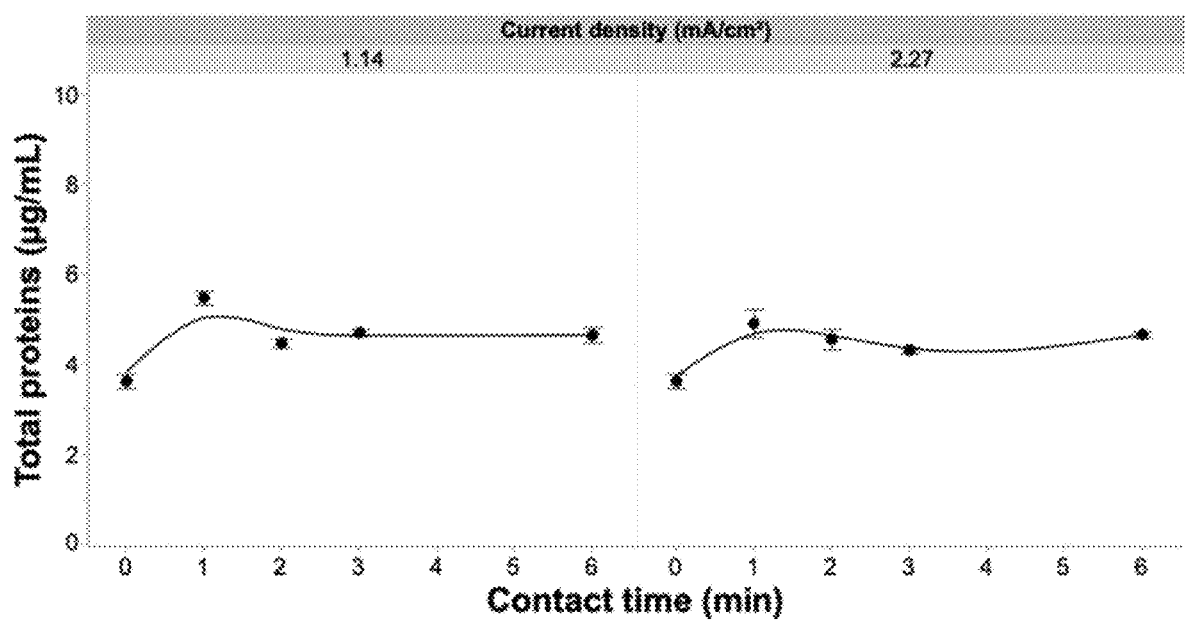
Figure 19C:
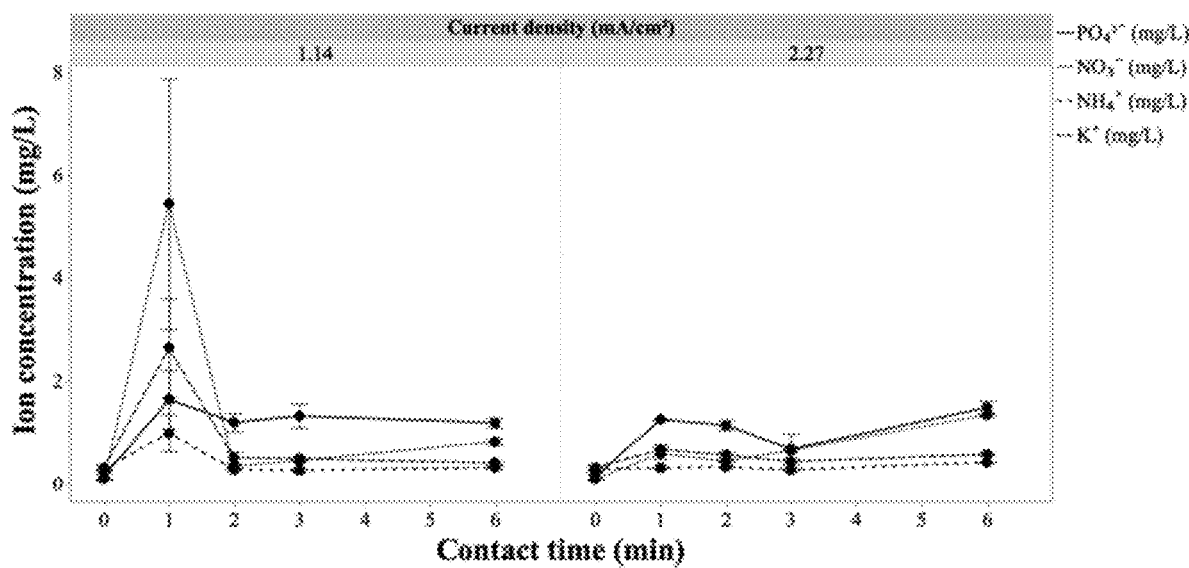

FIGS. 19A, 19B, and 19C: A. Degradation of NPOC by applying two different current densities over variable contact times of the solution passing through the EFC. The solution only contained the pathogen and deionized water in solution and showing that NPOC is directly related to dissolved components originating from the pathogen. Error bars are ±SEM, n=3. B-C show total protein and ion concentrations with different contact times.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

As used herein, the terms "invention" or "present invention" are non-limiting terms and not intended to refer to any single aspect of the particular invention but encompass all possible aspects as described in the specification and the claims.

All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control.

Unless defined otherwise, all technical and scientific terms used herein have the same meaning as is commonly understood by one of skill in the art to which the subject matter herein belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the following definitions are supplied in order to facilitate the understanding of the present invention.

As used herein, the articles "a" and "an" preceding an element or component are intended to be non-restrictive regarding the number of instances (i.e. occurrences) of the element or component. Therefore, "a" or "an" should be read to include one or at least one, and the singular word form of the element or component also includes the plural unless the number is obviously meant to be singular.

It will be further understood that the terms "comprises" and/or "comprising," or "includes", "including" and/or "having" and their inflections and conjugates denote when used in this specification, specify the presence of stated features, regions, integers, steps, operations, elements, and/or components, but do not preclude the presence or addition of one or more other features, regions, integers, steps, operations, elements, components, and/or groups thereof.

It will be understood that any component defined herein as being included may be explicitly excluded from the claimed invention by way of proviso or negative limitation.

As used herein, the term "about" refers to variation in the numerical quantity. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

Should a range of values be recited, it is merely for convenience or brevity and includes all the possible sub-ranges as well as individual numerical values within and about the boundary of that range. Any numeric value, unless otherwise specified, includes also practical close values and integral values do not exclude fractional values. Sub-range values and practically close values should be considered as specifically disclosed values.

As used herein the term 'may' denotes an option or an effect which is either or not included and/or used and/or implemented and/or occurs, yet the option constitutes at least a part of some embodiments of the invention or consequence thereof, without limiting the scope of the invention.

The phrase "and/or," as used herein in the specification and in the claims, should be understood to mean "either or both" of the elements so conjoined, e.g., elements that are conjunctively present in some cases and disjunctively present in other cases. Other elements may optionally be present other than the elements specifically identified by the "and/or" clause, whether related or unrelated to those elements specifically identified unless clearly indicated to the contrary.

As used herein, expressions such as "at least one of," when preceding a list of elements, modify the entire list of elements and do not modify the individual elements of the list.

"About," "approximately," or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about," "approximately," or "substantially" can mean within one or more standard deviations, or within ±30%, 20%, 10%, 5% of the stated value.

Controlled-environment agriculture (CEA), as used herein, includes technologies where all environmental factors can be controlled. Factors may include artificial control of light, environmental control (e.g. humidity, temperature, gases) and fertigation. CEA may include for example greenhouse, hydroponics, aquaculture, and aquaponics. CEA may also incorporate aspects of urban agriculture for plant growth such as raised beds, vertical gardening, container gardening and "growth chamber" production.

Fertigation, as used herein, is combining fertilizer and irrigation, a common industry term used to denote the delivery of fertilizer via the irrigation solution (i.e.) irrigation water. Such water is referred to as fertigation water or fertigation solution (the terms are used synonymously herein). Fertigation water is essentially nutrient feed water as it contains the essential elements required for healthy plant growth. It consists of various proportions of fertilizers dissolved in water or a blend of fertilizer solutions to provide the nutrient complement required for healthy plant growth.

Captured fertigation water is leached nutrient feed water, that is, the fertigation water that has been captured after passing though the growing substrate. It may or may not be recycled.

It can also be referred to as leachate or leach.

Fertilizer water/solution—a stock solution consisting of a single fertilizer, or several compatible fertilizers, dissolved in water containing the essential nutrients for plant growth. Fertilizers may be inorganic (chemical, wholly or partially synthetic origin and exclude carbon-containing materials) or organic (derived from the remains or byproducts of natural organisms such as animal excreta (manure), human excreta, and vegetable matter (e.g. compost and crop residues). Naturally occurring organic fertilizers include animal wastes from meat processing, peat, manure, slurry, and guano. Inorganic fertilizers may be classified according to whether they provide a single nutrient (e.g., K, P, or N), in which case they are classified as "straight fertilizers." "Multinutrient fertilizers" (or "complex fertilizers") provide two or more nutrients, for example N and P. Nitrogen-based straight fertilizers include ammonia and its solutions, ammonium nitrate ($NH_4NO_3$) and urea. The main straight phosphate fertilizers are the superphosphates. The main potassium-based straight fertilizer is Muriate of Potash (MOP).

Crop, as used herein, is a cultivated plant grown on a large scale commercially. The crop is understood not to be limited as understood by one of skill in the art. A crop may be edible or ornamental. "Plant" may be used interchangeably for "crop" herein. Within the scope of present invention, crops/plants to be protected typically comprise perennial and annual crops, such as but not limited in any manner to berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and *Zoysia* grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; vines for example grapes; and *Cannabis* such as *Cannabis sativa*, *Cannabis* indica and *Cannabis ruderalis*.

The useful plants and/or target crops in accordance with the invention include conventional as well as genetically enhanced or engineered varieties.

Crop security, as used herein, is being free from danger or threat from pathogens, phytotoxic chemical contaminants and/or nutrient imbalances.

The acronym EFC, as used herein, is an electrochemical flow cell.

Disinfect, disinfecting, inactivate, are each used synonymously herein, as meaning to destroy and/or inhibit growth of a pathogen, to render a pathogen inert and not harmful to crops/plants. A "susceptible" pathogen is likely or liable to be influenced or harmed by the regenerated disinfectant as described herein.

The term "effective amount" means the quantity of disinfectant that is capable of producing an effect on the growth of pathogen. Controlling or modifying effects include all deviation from natural development, such as killing, retardation and the like, and prevention includes barrier or other defensive formation in or on a plant to prevent infection.

The acronym DSA, as used herein, is a dimensionally stable anode. Dimensionally stable anodes are basically a titanium skeleton covered with electrocatalytically active mixtures of oxides. These anodes consist of mainly ruthenium oxide deposited on titanium along with other metallic oxides like platinum, iridium, palladium, rodium and titanium. Dimensionally stable anodes preserve their shape and voltage characteristics even under severe conditions of anodic attack. They exhibit dimensional stability, longer life and function effectively at higher current densities.

Regenerative mediated electrolysis, as used herein, is a process in which chloride ions are transformed to free chlorine forms (e.g., hypochlorous acid) which neutralizes pathogens and in this process releases chloride ions back to the solution. The chloride ions migrate back to the anode through electrostatic migration where once again they can be transformed to free chlorine forms leading to further pathogen inactivation.

A general non-limiting overview of the invention and practising the invention is presented below. The overview outlines exemplary practice of embodiments/aspects of the invention, providing a constructive basis for variant and/or alternative and/or divergent aspects/embodiments, some of which are subsequently described.

Electrochemical methods, and systems incorporating the methods, are now developed for the treatment of fertigation water that is used primarily in CEA operations where recycling of fertigation water is desired. The methods are effective to regenerate a disinfectant in effective amounts to inactivate plant pathogens that may be present in the fertigation water while ensuring effluent levels of the disinfectant is not harmful to plants.

In an embodiment, is a regenerative in situ electrochemical hypochlorination method and system that is demonstrated to effectively inactivate chloride susceptible pathogens and simultaneously degrade chemical contaminants in fertigation water used in controlled environment agriculture. The method and system are useful in recirculating irrigation systems employing fertigation water where chloride may otherwise accumulate. The method and system further prevents free chlorine, the active/disinfecting form of chlorine, from accumulating in the fertigation water. The method and system further maintains acceptable nutrient balances within the fertigation water being treated without build-up of free chlorine beyond phytotoxic thresholds.

In the regenerative in situ electrochemical hypochlorination method of the invention, the method does not require chemical supplementation once the method is established or substantially any chemical supplementation once the method is established. The electrochemical production of hypochlorous acid is regenerative, with the raw material (chloride ions ($Cl^-$)) being continually reformed after the free chlorine reacts with a pathogen or chemical contaminant. With a baseline level of chloride present in the fertigation solution, the method will provide continual disinfection without further chemical additions. It should also be noted that this baseline chloride concentration is well below phytotoxic thresholds. The process is inexpensive, safe (no hazardous chemical management), and does not lead to accumulation of chloride.

Surprisingly, as used for treatment of fertigation water, the effluent free chlorine levels remain well below reported phytotoxic thresholds. The residual free chlorine is consumed by a secondary process that appears slower than the pathogen inactivation pathway(s) resulting in effective pathogen inactivation without the threat of crop damage due to disinfectant toxicity. The method of the invention effectively and advantageously uses the presence of fertilizer in the water (fertigation water) for providing chemical mechanisms suppressing effluent free chlorine levels below phytotoxic thresholds.

An electrochemical flow cell (EFC) system is employed with each cell comprising a plurality of dimensionally stable anodes (DSA) and complementary cathodes (collectively an electrode array) supported within a casing/housing that may be any suitable material such as but not limited to acrylic. In one embodiment, the DSA may be $RuO_2$ and the complementary cathode stainless steel. The EFC may comprise a set of six $RuO_2$ DSA and a set of five complementary stainless steel cathodes spaced apart therefrom. In one embodiment, each cathode is spaced about 2 mm apart from each of its complementary anode. Generally, the closer the electrodes, the better the electron transfer is, and the less conductivity the influent fertigation water needs to have. However, the electrodes may be further apart and still be effective. The electrodes should not be in direct contact with each other.

Fertigation water to be treated is pumped via a variable speed peristaltic pump into the bottom entry port of the EFC housing and upwards through the electrodes, exiting the cell at an outflow port at the top of the housing. A power supply is connected to both anode and cathode of the flow cell. Multimeters are provided with direct connection to the anode and cathode of the cell for measuring the applied voltage. It is understood by one of skill in the art, that the electrochemical flow cell (EFC) system employed may be scaled to a desired size and volume of fertigation water, used in series, and further connected to an irrigation system to deliver the treated fertigation water to the crop and collect run off for pooling and recirculation. It is also understood that the scaled system may further comprise a variety of sensors and so forth for operation. A pre-filter may be added in the influent fertigation water stream or a post-filter may be added in the effluent treated fertigation stream to catch particles. The EFC may have any practically useful shape that may be utilized for fertigation water purification purposes. The shape of the EFC cell is not limited.

The EFC according to any embodiment, may further include an oxidation-reduction potential sensor, a pH sensor, a chlorine sensor, a conductivity sensor, a flow rate sensor, a temperature sensor, or a combination thereof.

In another embodiment, EFC may include two or more sequentially connected individual flow-through cells. The treated fertigation water may be delivered to the next flow-through cell, where the purification process is repeated.

One of skill in the art would understand that the selection of anode is dependent on the ability to function to continuously regenerate chloride ions to free chlorine forms and release chloride ions back to the solution where they migrate back to the anode through electrostatic migration to again transform into free chlorine, the free chlorine inactivating a pathogen.

Using this electrochemical cell system, pathogen control is achieved through the manipulation, in isolation or in combination, of the applied current, contact time, and the concentration of chloride in solution. The system maintains a low concentration of chloride (20 mg/L) while the current density and/or the residence time (flow rate) may be adjusted in relation to the free chlorine demand and in this manner proving to be effective for pathogen inactivation. The effluent free chlorine concentration using fertigation water, is maintain below the phytotoxic threshold (~2.5 mg/L). Chloride concentrations remain stable throughout the treatment process. This is in direct contrast to continuous free chlorine dosing, which leads to the accumulation of chloride, potentially to phytotoxic levels, in recirculating systems. The electrochemical cell system does not alter the macronutrient composition. Effective pathogen inactivation combined with sub-phytotoxic free chlorine residuals make the system compatible with greenhouse crop production.

In a further embodiment, the electrodes used are BDD to continuously produce reactive oxygen species (ROS) as the disinfectant to inactivate pathogens. In this aspect, advantageously the fertigation water is nutrient enhanced during treatment thereof by releasing ammonium into solution that is converted to nitrates thus being bioavailable to the crop(s) irrigated with the treated fertigation solution. Thus the recycling of fertigation water within the system in accordance with the methods described herein functions to enrich the treated fertigation water (with ammonium, nitrate, sulphate and calcium) and encourage crop growth. In this embodiment using BDD as the anodes, chloride may further be added to enhance inactivation of pathogens as is understood by one of skill in the art. The chloride is also stably regenerated thus providing two sources of disinfectants in the treated fertigation water while maintaining safe levels of free chlorine as well as safe acceptable levels of chlorate species.

The methods and systems described herein are suitable for use for any fertigation water that comprises either inorganic or organic fertilizer and even mixtures thereof. In aspects, organic fertilizer water is employed with an EFC incorporating BDD.

The methods and systems may be employed in any fertigation irrigation system for any type of CEA employing recycling of their fertigation water.

The methods and systems described herein are suitable for use for any desired crop, edible or ornamental. In aspects, the methods and systems are beneficial for growing *cannabis* such as for example in greenhouses and further hydroponically utilizing treated fertigation water of the invention and recycled treated fertigation water.

The descriptions of the various embodiments and/or examples of the present invention have been presented for purposes of illustration but are not intended to be exhaustive or limited to the embodiments and/or examples disclosed. Many modifications and variations will be apparent to those of ordinary skill in the art without departing from the scope and spirit of the described embodiments. The terminology used herein was chosen to best explain the principles of the embodiments, the practical application, or to enable further understanding of the embodiments disclosed herein.

EXAMPLES

Example 1—Inactivation of *Rhizoctonia solani* in Fertiation Water Using Regenerative in Situ Electrochemical Hypochlorination—Ruthenium Oxide Dimensionally Stable Anodes Materials and Methods
Pathogen Cultures A pure culture of *Rhizoctonia solani* was provided courtesy of Dr. Allen Xue from the Plant Pathology Ottawa Research and Development Centre, Agriculture and Agri-Food Canada. Mycelia were inoculated onto potato dextrose agar (PDA) (B213400, Fisher Scientific, Canada) containing 0.1 g/L of streptomycin sulfate (BP910-50, Fisher Scientific, Canada) and 0.05 g/L of ampicillin sodium salt (BP1760-25, Fisher Scientific, Canada). The plates were then incubated on the laboratory bench inside a clear plastic container at room temperature (~23° C.) and ambient light levels. After incubation for seven days the plates were fully covered with mycelia, at which point five 1 $cm^2$ sections of the mycelia mat were excised from the outer edge of the petri dish and placed into 250 mL Erlenmeyer flasks, each containing 100 ml Potato Dextrose Broth (PDB) (B254920, Fisher Scientific, Canada). The suspension was then placed in an incubator (Innova 4340, New Brunswick Scientific, USA) for 8 days at 30° C. under a 12 hr photoperiod. The cultured mycelia were then transferred to a blender (HH-362, E.F. Appliances Canada LTD.) and blended for 30 seconds. A pipette (4642110, Thermo Scientific, USA) was used to inoculate 10 ml of the suspension into new Erlenmeyer flasks with 250 mL of PDB and further incubated for another 8 days under the same conditions previously described.

Test Solution Preparation

*Rhizoctonia solani* cultures were vacuum filtered through a 1.5 μm filter disk (Whatman 934—AH) to separate the mycelia from the liquid broth. The mycelia were rinsed off the filter disk with deionized (DI) water and deposited in a 500 mL sterile beaker and filled to 300 mL with DI water. The suspension was then transferred to a blender and blended for 1 minute. The blended suspension was then added to a 60-litre reservoir containing 30 litres of DI water. This solution was then subjected to the electrochemical treatment.

The fertilizer solutions with added chloride, in the form of potassium chloride ((P330-500), Fisher Scientific, Canada), were prepared by weighing out (TE 124S, Sartorius, Germany) appropriate amounts of stock material (20-8-20 Plant Prod, 10561, Master Plant-Prod Inc., Canada; ammonium sulphate (A702-3) and potassium chloride) to bring the final solution volume to the targeted concentrations for each experiment (Table 1). The Plant Prod fertilizer consisted of Nitrate (4.3 mmol/L), Phosphate (0.55 mmol/L), Ammonium (2.64 mmol/L) and Potassium (2.80 mmol/L) at 0.5 grams per liter of solution. Other ions in trace amounts are Sulphate (40 μmol/L), Sodium (150 μmol/L), Magnesium (60 µmol/L), Calcium (30 µmol/L) and Nitrite was not initially present. Individual macronutrient ions from a 0.5 g/L solution were measured with a Shimadzu HPLC system consisting of a DGU-20A3 degasser, a SIL-10AP autosampler, two LC-20AT pumps, two CDD-0A VP conductivity detectors, CTO-20AC column oven, and CBM-20A system controller. Total Nitrogen was measured using a Shimadzu TNM-1 unit (Shimadzu Scientific Instruments, USA).

TABLE 1

Fertigation solution composition summary for each experiment presented. Solution compositions are cross referenced with their respective figures for clarity.

Figure 3:
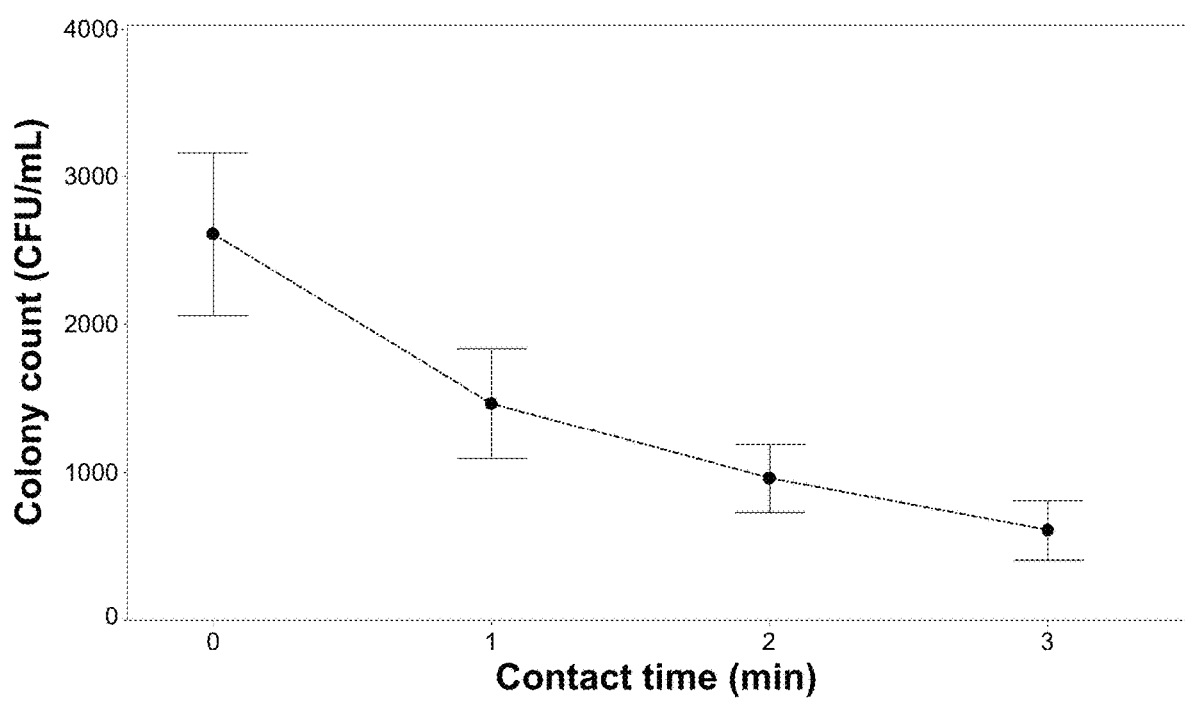
Figure 4A:
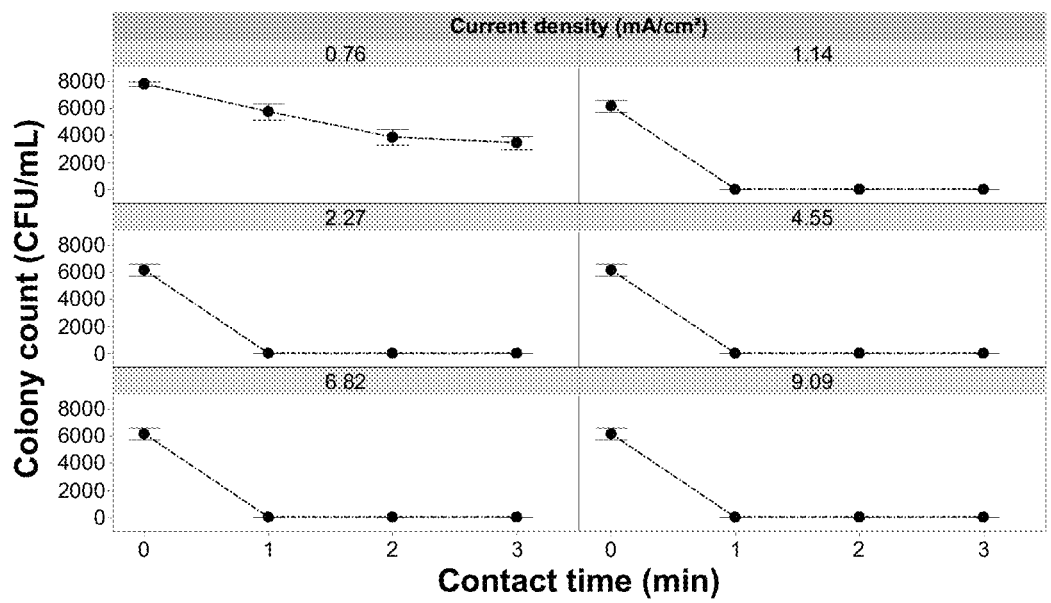
Figure 4B:
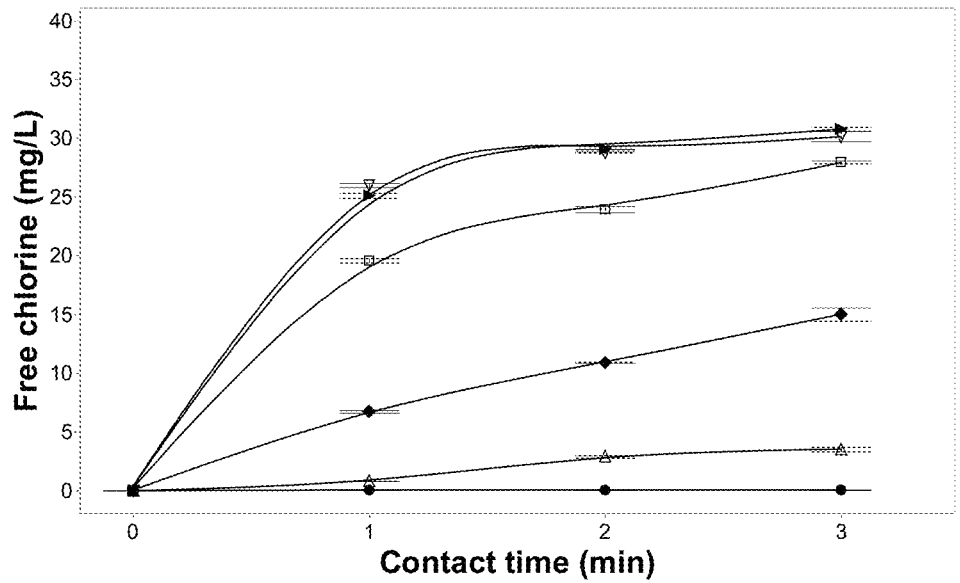
Figure 5:
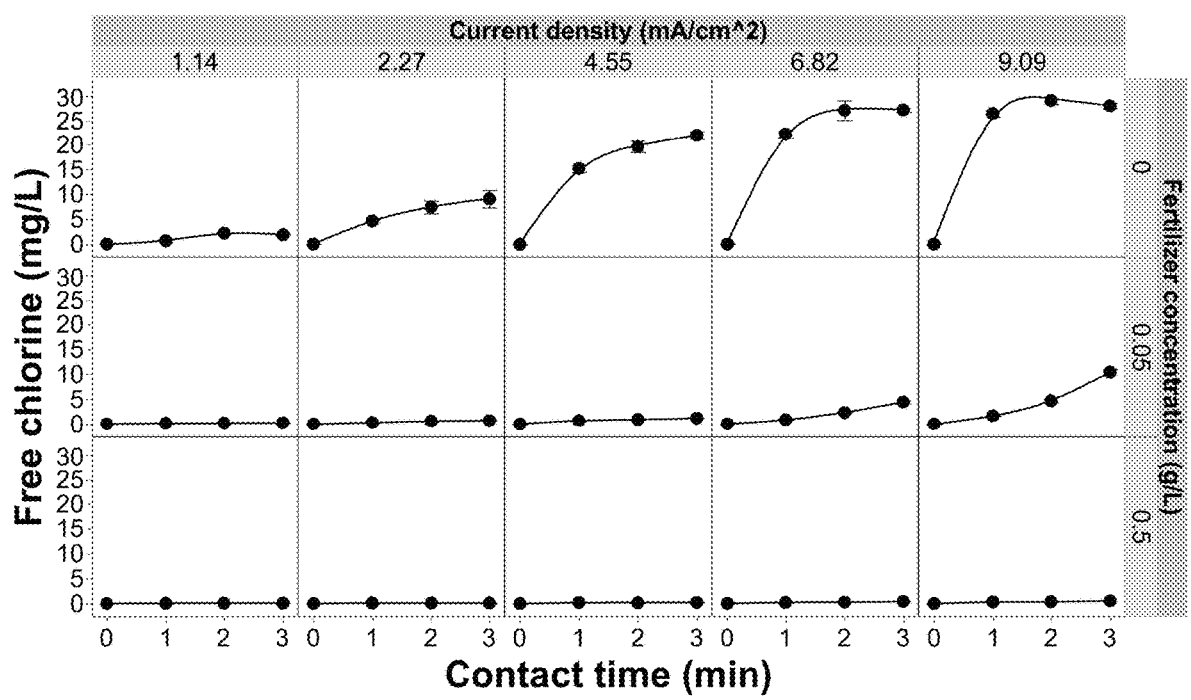
Figure 6A:
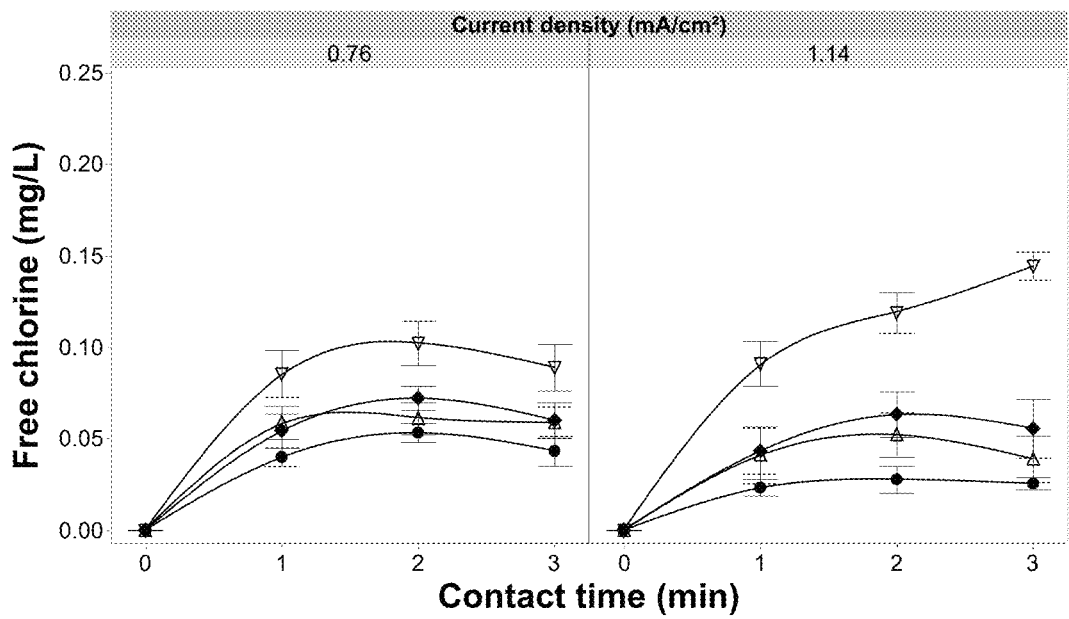
FIG. 6A shows inactivation of Rhizoctonia solani as a function of current density with a fertilizer concentration of 0.5 g/L and increasing chloride concentration.
Figure 6B:
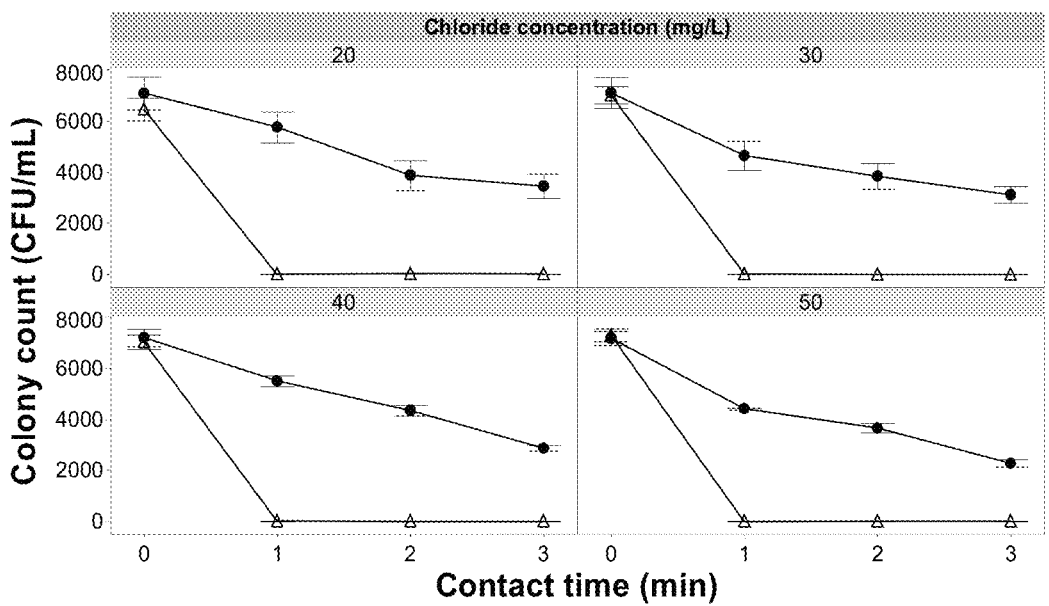
FIG. 6B shows effluent free chlorine concentrations observed under the same parameters while increasing the concentration of chloride. Error bars are ±SEM, N=3, n=3.
Figure 7A:
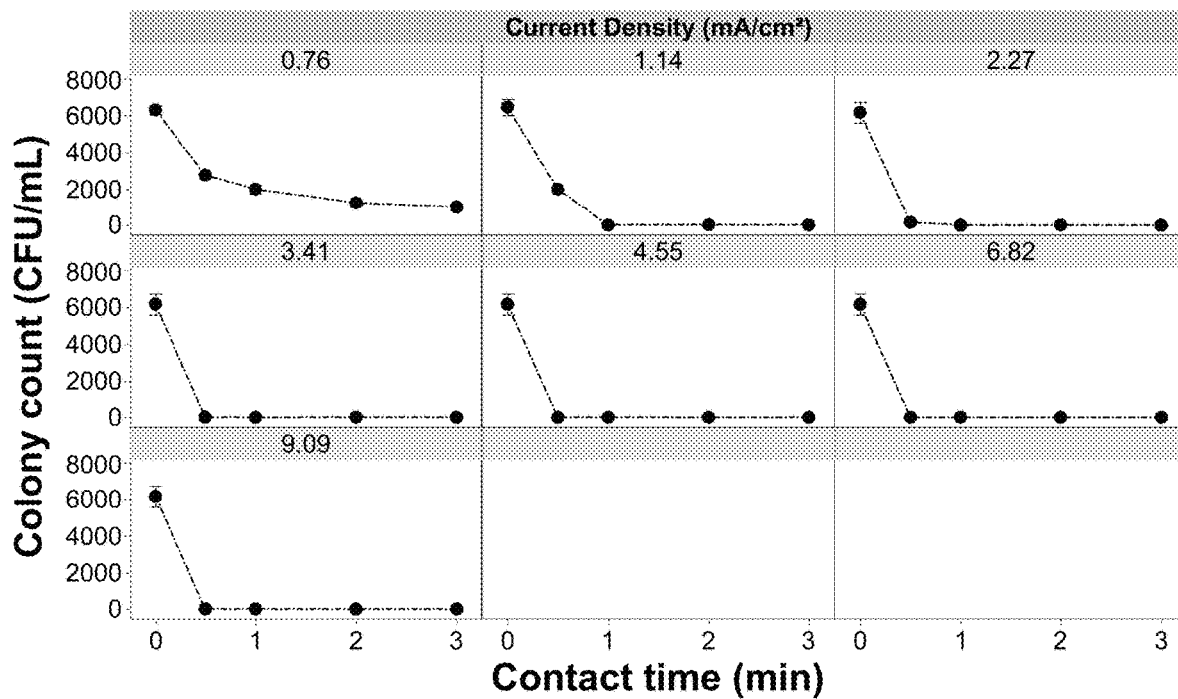
FIG. 7A shows Rhizoctonia solani inactivation as a function of current density and contact time with 20 mg/L of chloride and 0.5 g/L of fertilizer in solution.
Figure 7B:
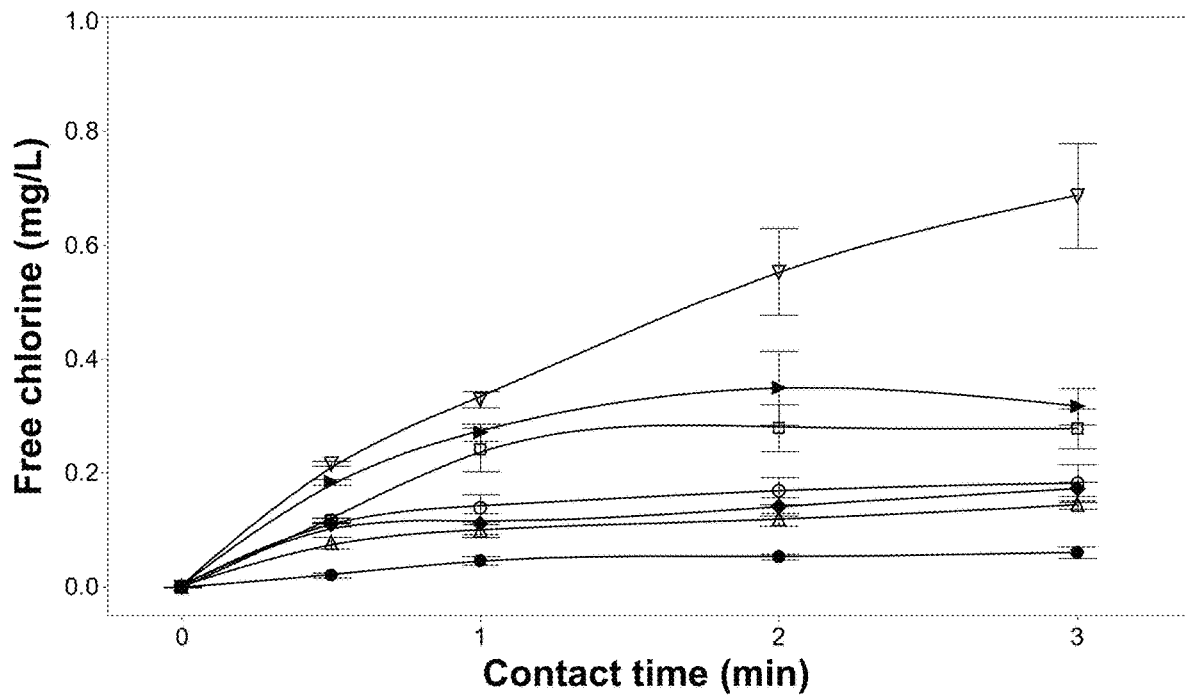
FIG. 7B shows effluent free chlorine from the EFC with applying variable current densities and contact times with the same test solution. Error bars are ±SEM, N=3, n=3.

| FIGS. | Chloride ($Cl^-$) concentration (mg/L) | Fertilizer type | Fertilizer concentration (g/L) |
|---|---|---|---|
| FIG. 3 | 0 | N/A | 0 |
| FIG. 4A & 4B | 20 | N/A | 0 |
| FIGS. 5 | 20 | Plant Prod (20-8-20) | 0–0.5 |
| FIGS. 6A & 6B | 20–50 | Plant Prod (20-8-20) | 0.5 |
| FIGS. 7A & 7B | 20 | Plant Prod (20-8-20) | 0.5 |
| FIG. 8A & 8B | 20 | $(NH_4)_2SO_4$ | 0.02 |

Electrochemical Flow Cell and operation procedures

Figure 2A:
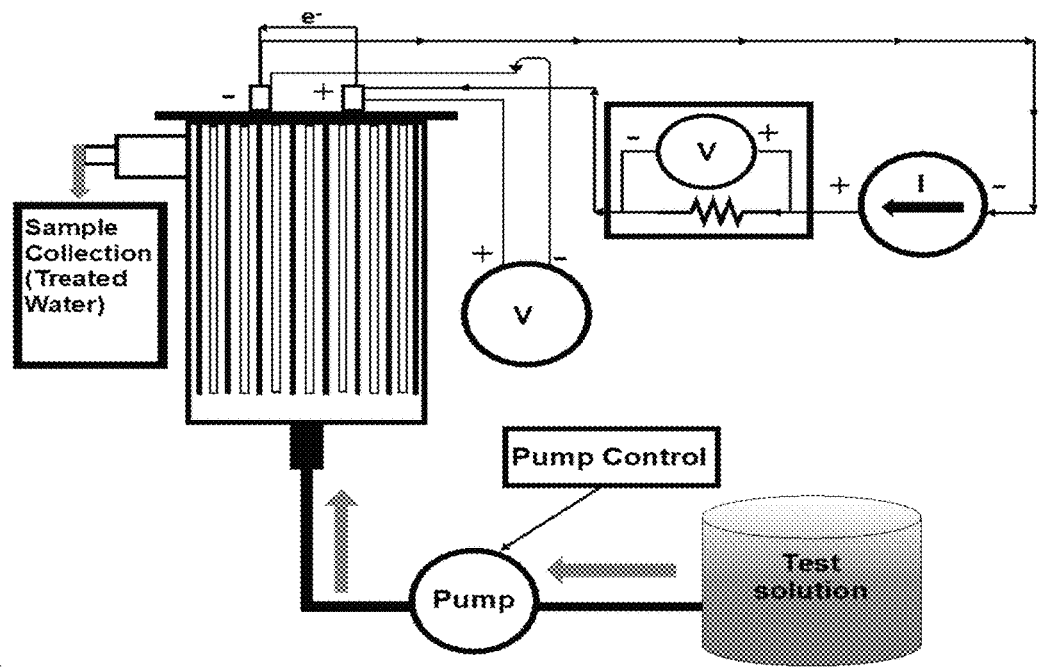
Figure 2B:
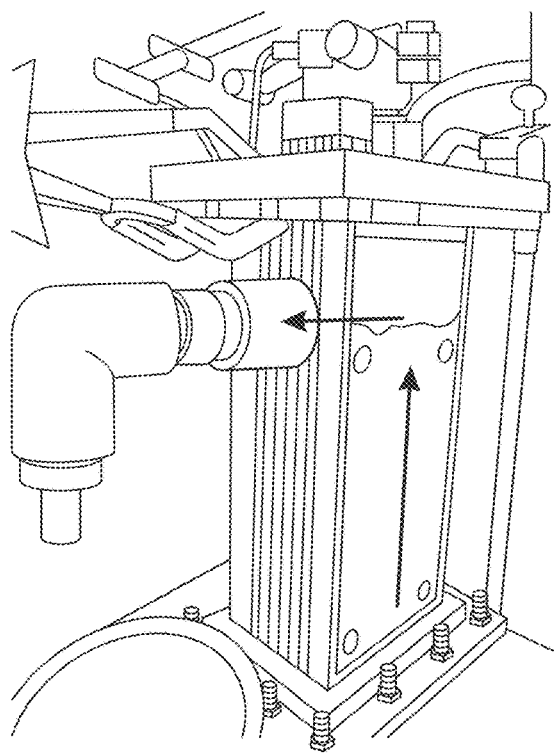
Figure 2C:
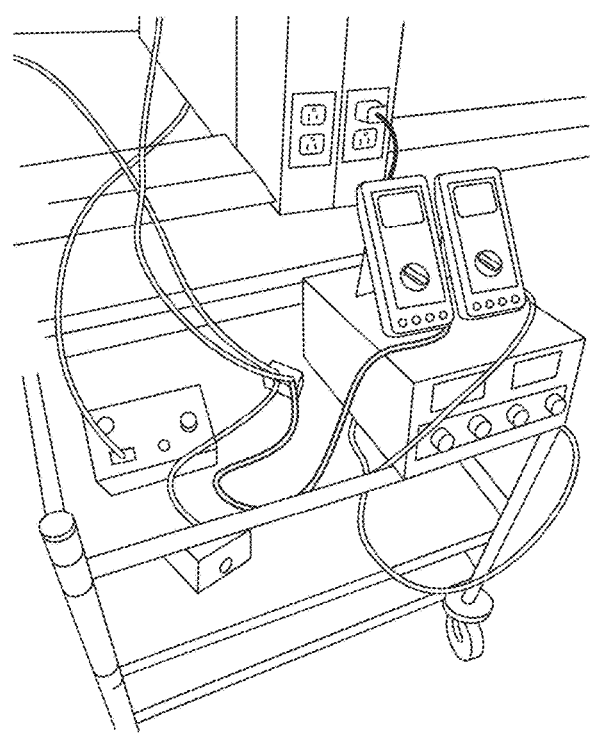

The electrochemical flow cell (EFC) system used consisted of a set of six $RuO_2$ dimensionally stable anodes (DSA) (De Nora Tech, Concord, USA) and a complementary set of five stainless steel cathodes, spaced 2 mm apart, in an acrylic casing. The total area of the anodes was 1320 cm$^2$. Solutions entered the cell from the bottom, passed upwards through the electrodes, and exited the cell at an outflow port at the top of the housing (FIGS. 2A & 2B). A power supply (DF1730SC 20A DC power supply, Gold Source, China) was connected to the anode and cathode of the flow cell. The applied current value was derived from the voltage drop measured across a precision current resistor (RS-50-100, RIEDON, Alhambra, CA) using a multimeter (Fluke 189, Fluke Corporation, Canada). A second multimeter (Fluke 87, Fluke Corporation, Canada) connected directly to the anode and cathode of the cell measured the applied voltage (FIG. 2C). A second multimeter is connected directly to the terminals of the anode and cathode array to measure the applied voltage. A variable speed peristaltic pump (Cole-Parmer 1-100 RPM) drew water from the test solution reservoir to the entry port located at the base of the flow cell.

The total free volume of the EFC, the internal volume of the housing less the volume of the electrode assembly, was 380 mL. The targeted contact times were achieved by adjusting the flow rates through the cell such that a given volume of solution would remain in contact with the electrodes for the desired time interval.

Untreated samples were collected from the main reservoir at the start, middle, and end of each experiment. Colony counts from each time point were averaged and used as the control or starting value for each test condition examined in a given experiment. Three effluent samples were collected from the outlet of the EFC for each treatment combination. The first sample was collected after three cell volumes (1140 ml) had passed through the flow cell, while samples two and three were collected after one and two additional flow cell volumes had passed through the system. Samples were collected in 40 ml clear plastic HDPE vials (20120121, Richard's Plastics, Canada). The pH (542, Corning, USA) and free chlorine concentration, for solutions containing chloride, were measured prior to microbial enumeration. Free chlorine from the bulk solution was measured according to the manufacturer's methods using DPD Test 'N Tube cuvette with free chlorine reagent set (2105545, Hach Company, USA) and a DR/850 portable colorimeter (4845000, Hach Company, USA). The samples were then serially diluted ($10^1$, $10^2$, $10^3$ and $10^4$) in glass test tubes and a 100 µL aliquot from each was spread onto plates with PDA and antibiotics under a laminar flow hood. Plates were inverted and incubated at 30° C. under 12-hr photoperiod at 100 µmol·m$^{-2}$·s$^{-1}$ photosynthetically active radiation light for 2 days. Total colony forming units per milliliter (CFU/ml) were counted after the incubation period elapsed.

Statistical Analysis

Statistical analyses were performed using JMP version 14.0 (SAS Institute Inc, Cary, NC). The residuals between data points and predicted values were tested for normality using the Shapiro-Wilk test. Data that did not pass were transformed and the analysis was conducted on the transformed data. Simple and multiple linear regression was performed on individual experiment sets. Summary of fit from linear regression models used the adjusted R squared values and significance was determined using $\alpha=0.05$. Linear regression analysis was conducted to determine any effects on [individual] nutrient composition.

Irrigation source waters can contain a wide range of chemical contaminants including pesticides, herbicides, growth regulators, plasticizers, and pharmaceuticals, as well as biological contaminants (*Phytophthora* spp., *Pythium* spp., *Rhizoctonia* spp., *Fusarium oxysporum, Erwinia* spp. & *Xanthomonas* spp.) (Agrawal et al., 2010; Bush et al., 2003; Delpla et al., 2009; Hong & Moorman, 2005; Kashian & Dodson, 2002), all of which can negatively impact crop production and increase the number of unsaleable plants (Stewart-Wade, 2011).

There are significant challenges associated with capture and re-use irrigation systems including increased risk of pathogen proliferation, the potential for accumulation of potentially phytotoxic chemical contaminants and nutrient imbalances in irrigation systems (Evans, 1994; Grant et al., 2018; Reemtsma et al., 2013; Toze, 2006).

Chlorination while widely recognized and effective at inactivating microorganisms, is associated with drawbacks. The continuous addition of liquid free chlorine (HOCl, $ClO^-$, $Cl_{2(aq)}$) or injection of chlorine gas ($Cl_{2(g)}$) in water will result in a variable distribution of free chlorine species that have differing pathogen inactivation efficacies depending on specific solution conditions (e.g., pH) and affect the contact times necessary for pathogen inactivation (Cayanan et al., 2009). Furthermore, the manual addition or injection of free chlorine can lead to the accumulation of chloride beyond phytotoxic thresholds (species specific); if not addressed crop damage/loss can occur (Ibrahim et al., 2015). In traditional chlorine injection systems residual free chlorine and chloride levels must be continuously monitored to ensure phytotoxic levels are not reached. There are also associated dangers to greenhouse operators when using chlorine, especially with chlorine gas, which can cause pulmonary health effects at low levels (Raudales et al., 2014; Zheng et al., 2008).

Control Experiments—Zero Current Control

A control experiment was conducted at several contact times with solutions containing *R. solani*, fertilizer (0.5 g/L Plant Prod), and 20 mg/L of chloride but without any applied current. There was no reduction in pathogen counts, indicating that there was no physical mechanism (e.g., a filtering effect) that may have been acting to reduce pathogen counts.

Pathogen Inactivation without the Presence of Fertilizer or Chloride

FIG. 3 shows the inactivation of *Rhizoctonia solani* when applying a current density of 0.76 mA/cm$^2$ without the presence of fertilizer and chloride. When the soluble fertilizer and chloride are absent and a low current density (0.76 mA/cm$^2$) is applied there is a detectable inactivation of *Rhizoctonia solani*. Pathogen inactivation increased with increasing contact time (FIG. 3), with a 77% reduction after a 3-minute exposure. The pH of the solution also remained stable at ~5.5 throughout all contact times that were tested.

The observed inactivation under these conditions may be due to the acidic environment in the immediate vicinity of the anodes as at low pH levels non-enzymatic proteolysis can occur on the mycelial sheath of *Rhizoctonia solani*, ultimately leading to cell death if the exposure is sufficient (Altun & Cetinus, 2007; Álvarez et al., 2000; Permentier & Bruins, 2004). Structural changes to microorganisms, such as the cleavage of proteins, have been shown to occur at a constant potential of 0.8 and 1.0 V (Permentier & Bruins, 2004; Tsong, 1990) but higher potentials are likely needed to cleave polysaccharides. The operating voltage for this experiment was ~32 V, which appears sufficient for this process to occur. This higher applied potential could also induce electroporation, a process by which the cell membrane becomes increasingly permeable, ultimately leading to loss of function and cell death (Drees et al., 2003; Nikolić & Panić, 2014; Pillet et al., 2016; Rowan et al., 2000; Tiehm et al., 2009). Increasing the porosity of the cell envelope leads to leakage of cellular material (Liang et al., 2005). However, this effect has also been shown to be species-specific in studies with gram-negative and gram-positive bacteria (Drees et al., 2003; Tiehm et al., 2009). Other possible mechanisms include direct oxidation of polysaccharides at the anode (Beeson et al., 2011), protein extraction (cleavage of disulfide and/or peptide bonds due to the discharge of water and dissolved oxygen molecules) at the cathode (Kuprina et al., 2003), or reductive hydrogen peroxide production at the cathode (Kraft, 2008).

Inactivation of *Rhizoctonia solani* in a Solution Containing Chloride

In the absence of fertilizer salts, the EFC achieved complete pathogen inactivation at all but the lowest current densities (0.76 & 1.14 mA/cm$^2$) for the 1-min contact time when chloride (20 mg/L) was present in the solution (FIG. 4A). The 20 mg/L chloride concentration was chosen as it was well below the reported phytotoxic thresholds of most crops (species specific) (Ibrahim et al., 2015) and showed efficacy in preliminary testing (data not shown). At a current density of 0.76 mA/cm$^2$ pathogen inactivation was greatly enhanced in comparison to the previous experiment in which there was no chloride or fertilizer present (FIGS. 3 & 4A). Although, when considered in combination with the results shown in FIGS. 4A and 4B, it appears that a current density of 0.76 mA/cm$^2$ while effective, may not provide the required energy to generate a sufficient amount of free chlorine to completely control pathogens. A free chlorine residual was measured and complete inactivation was achieved at a current density of 1.14 mA/cm$^2$ after a 2-min contact time, indicating that the critical current density threshold lies somewhere between 0.76 and 1.14 mA/cm$^2$. This result shows the EFC's ability to achieve complete inactivation with a lower contact time of 2-minutes and releasing an even lower free chlorine concentration (~2.88 mg/L). Beyond a current density of 1.14 mA/cm$^2$, complete inactivation was achieved by the 1-min contact time (FIG. 4A), which is expected given the relatively high free chlorine levels achieved at these current densities (FIG. 4B).

Regression analysis was used to characterize the production of free chlorine as a function of contact time and current density. Results indicate that there is a significant relationship ($R^2$=0.60; p<0.0001) between contact time and current density. The pH was shown to respond proportionally to contact time, with pH increasing from 5.5 to as high as 8.5 at the longest contact times (data not shown).

The free chlorine residuals observed (FIG. 4B) are well beyond reported phytotoxic thresholds with a residual of ~25 mg/L for 6.82 mA/cm$^2$ at the 1-minute contact time (Buck et al., 2003; Bush et al., 2003; Cayannan et al., 2009; Ibrahim et al., 2015). Under these solution conditions (e.g., raw irrigation water with trace chloride levels) there would be a need to include a free chlorine stripping step prior to crop application (Cayanan et al., 2009, Fisher et al., 2014; Raudales et al., 2014). This said, under these conditions the system could be used to generate sufficient free chlorine residuals to provide system-wide disinfection between crop cycles.

Free Chlorine Evolution with Increasing Fertilizer and Current Density

Pathogen inactivation efficacy was demonstrated in the presence of a representative commercial fertilizer. Effluent free chlorine levels at three different concentrations of commercial fertilizer were evaluated at a fixed chloride concentration of 20 mg/L in the absence of *Rhizoctonia solani* (FIG. 5). This chloride concentration is compatible with crop production (Ibrahim et al., 2015) but still provides sufficient chloride to generate phytotoxic levels of free chlorine in the absence of a free chlorine stripping step (FIG. 4B). FIG. 5 shows a positive correlation between the production of free chlorine and the contact time of the solution with the electrodes. Further, when increasing the current density there is a large increase in the amount of free chlorine produced in bulk solution when fertilizer levels are low (0 and 0.05 g/L). Although the free chlorine levels rose quickly they reach a plateau at about the 2-min contact for current densities of 6.82 and 9.09 mA/cm$^2$ when fertilizer was not present. The data presented in FIG. 5 indicates that the concentration of effluent chlorine at lower current densities is current limited, while at higher current densities the system becomes mass transport limited. Mass transport limitation was due to depletion of chloride ions at the anode-solution interface as local supplies of chloride were transformed to free chlorine. At higher current densities the conversion of chloride to free chlorine was greater than the replenishment rate of chloride, which lead to the observed plateau (FIG. 4B; FIG. 5). When fertilizer was introduced into the test solution, even in small amounts (i.e., 0.05 g/L), the free chlorine residuals decreased by as much as two orders of magnitude (FIG. 5, middle row panels). At an application rate of 0.5 g/L, the free chlorine dropped to <1 mg/L; well below reported phytotoxic thresholds (~2.5 mg/L).

The introduction of fertilizer clearly reduced the residual free chlorine concentrations in the test solutions (FIG. 5). Given the significant drop in free chlorine levels, even at modest fertilizer concentrations, fertility regimes should be considered when determining contact times and current densities in these types of systems. The dramatic reduction in effluent free chlorine in the presence of fertilizer indicated that there was a competing sink (in the fertilizer) for free chlorine. If the competing sink is more effective at consuming free chlorine than the pathogen inactivation mechanisms then the system would not be effective for pathogen control in typical greenhouse production systems. Conversely, the pathogen inactivation mechanisms predominated making it possible to control pathogens while taking advantage of the secondary sink present in the fertilizer to reduce the free chlorine levels below reported phytotoxic thresholds.

Rhizoctonia solani Inactivation Experiments—Pathogen Inactivation in the Presence of Fertilizer In order to determine the influence of the competing free chlorine sinks on pathogen inactivation efficacy, Rhizoctonia solani inactivation was determined in the presence of fertilizer while increasing both chloride concentrations (FIG. 6) and current densities (FIG. 7).

When chloride concentrations were increased from 20 to 50 mg/L under the lowest current density (0.76 mA/cm$^2$), there was a modest increase (17%) in pathogen inactivation but not sufficient to result in complete inactivation even at the 3-min contact time (FIG. 6a). Increasing the current density to 1.14 mA/cm$^2$ resulted in complete inactivation at chloride levels 30, 40 & 50 mg/L beyond a 2-min contact time (FIG. 6A). Once again, at both current densities, the free chlorine residuals in the outflow were well below phototoxic thresholds (FIG. 6B). When increasing the concentration of reactants (chloride) at the anode surface, free chlorine concentrations in the bulk solution will increase concomitantly due to mass transport mechanisms that move the free chlorine away from the anode and into the bulk solution (Bagotsky, 2005; Gileadi, 2011). Increased bulk solution free chlorine concentrations likely lead to the increased inactivation rates as more pathogen propagules would come into contact with free chlorine in the bulk solution relative to the limited anode surface area.

Free chlorine generation was monitored while maintaining constant current densities (0.76 mA/cm$^2$ and 1.14 mA/cm$^2$) over increasing chloride concentrations (20 mg/L to 50 mg/L) (FIG. 6B). In this scenario there was a marginal increase in free chlorine leaving the EFC (FIG. 6B). However, this increase in free chlorine generation was minimal given the 2.5-fold increase in chloride concentration (FIGS. 6A and 6B). It is clear that under the conditions tested, the manipulation of other process control mechanisms (e.g., current density and contact time) are more influential in achieving pathogen inactivation.

Inactivation of Rhizoctonia solani as a Function of Current Density

Increasing the current density while maintaining a constant chloride concentration (20 mg/L) increased pathogen inactivation efficacy (FIG. 7A). As current density increased more electrons became available [at the anode surface] to participate in the reactions leading to the formation of free chlorine. As this charge transfer increased, the amount of free chlorine produced was no longer current limited; rather, it became governed by the mass transfer efficiency of the system (FIG. 4B; FIG. 5) (Bagotsky, 2005; Gileadi, 2011; Fan et al., 2007). The increased free chlorine concentration at the anode supports a greater flux to the bulk solution where it is available to further react with free-floating pathogen cells. The EFC achieved higher inactivation rates of Rhizoctonia solani after a 1-min contact time, with the exception of the lowest current density (0.76 mA/cm$^2$) (FIGS. 4A, 6A, 7A). When increasing the current density to 1.14 mA/cm$^2$, there was a 2.80 log reduction for the 1-minute contact time and beyond. When increasing the current to 2.27 or 3.41 mA/cm$^2$, a 3.75 log reduction was achieved at the 1-minute contact time. A current density of 4.55 mA/cm$^2$ achieved similar log reductions to lower current densities but inactivation was achieved in half the time (30 seconds). The highest current densities (6.82 and 9.09 mA/cm$^2$) resulted in complete inactivation at all contact times tested.

When fertilizer is present in the test solution the effluent free chlorine residuals were consistently and considerably lower (<0.8 mg/L free chlorine) (FIG. 7B) than solutions that did not contain fertilizer (FIG. 4B) regardless of the current density applied. One of the main concerns with using free chlorine to treat irrigation water is phytotoxicity, which can occur at effluent concentrations as low at ~2.5 mg/L (Cayanan et al., 2009; Ibrahim et al., 2015). Presently, the addition of fertilizer salts, at concentrations consistent with commercial recipes, reduced effluent free chlorine to levels compatible with crop production (Cayanan et al., 2009; Ibrahim et al., 2015); yet, the addition had negligible impacts on pathogen inactivation efficacy. Even at the highest current densities and contact times achievable with the current system, the effluent free chlorine residuals still remained well below reported phytotoxic thresholds (FIG. 5). The ability to apply these high currents and/or long contact times, without the threat of exposing the crop to phytotoxic levels of free chlorine, demonstrate that even recalcitrant pathogens could be controlled through the manipulation of contact time and/or current density.

Nitrogen Dynamics in the EFC System

The reduction in free chlorine residuals in the presence of fertilizer containing ammonium (FIG. 5) suggests that breakpoint chlorination occurred during treatment.

Ammonium sulphate was used as a supporting electrolyte at a concentration of 0.02 g/L, which corresponds to the total nitrogen in the 0.05 g/L fertilizer solutions used in the other experiments presented (FIG. 5). At a current density of 1.14 mA/cm$^2$, the concentration of ammonium was inversely proportional to the contact time. However, the concentration of nitrate, which was not initially present, was also shown to be proportional to the contact time. The result was no net change in total nitrogen (FIG. 8A). At lower current densities, the conversion favoured nitrification (FIG. 8A). At higher current densities (e.g., 2.27 mA/cm$^2$) nitrification also occurred; however, denitrification also became part of the overall process ultimately leading to a small net loss of total nitrogen from the solution (Bejan et al., 2013). The amount of nitrogen lost from the solution increased modestly with increasing current densities (4.55-9.09 mA/cm$^2$; data not shown).

Free chlorine was shown to variably increase between the current densities and the contact times applied to the solution when containing ammonium sulphate (FIG. 8B).

However, these levels of effluent free chlorine are smaller than the amount leaving the EFC in bulk solution when no fertilizer was present (FIG. 4B). The suspected cause for this decreased effluent free chlorine with the presence of fertilizer is due to the consumption by ammonium and transformations to other nitrogenous species due to direct oxidation by the anode and indirect oxidation from free chlorine (Li et al., 2017; Meador & Fisher, 2013; Raudales et al., 2014). Maintaining the pH between 5.5 and 6.5, which is compatible with crop requirements, limits the amount of nitrogen lost from the system. The surface of the anodic working electrode for $RuO_2$ produces portions of $N_2$, $NO_2^-$ and $NO_3^-$, which are increasingly formed with higher pH and current densities. The conversion rates of these products are limited in undivided electrochemical cells, such as the one presented herein, in comparison to divided cells. Thus, the loss of total nitrogen will be limited due to the characteristics of the fertigation solution being treated and the use of an undivided cell.

At higher current densities, breakpoint chlorination has been demonstrated as the most likely mechanism for the consumption of free chlorine, while lower current densities favoured the formation of secondary reactions such as nitrate generation. Breakpoint chlorination is likely the predominant secondary sink for free chlorine in the present methods, however, the consumption of excess (beyond pathogen inactivation demand) free chlorine cannot be solely relied upon as only being caused by breakpoint chlorination. Other components in fertilizer also contribute to the consumption of free chlorine, such as Ethylenediaminetetraacetic acid (EDTA), $Fe^{2+}$ and $Mn^{2+}$ Nutrient Stability Individual macronutrient ions from the 0.5 g/L fertilizer solution treated at a current density of 4.55 $mA/cm^2$ were measured. This current density was more than sufficient to inactivate pathogens under all test conditions, yet maintained residual free chlorine levels below phytotoxic levels in the presence of fertilizer (FIG. 4A, 5, 7A). The effluent concentration of chloride was shown to decrease in proportion to the amount of free chlorine leaving the EFC, which is consistent with the expected chlorine mass balance. Less transient chloride reductions could be due to degassing ($C_{2(g)}$), chloramination or free chlorine reacting inside pathogen cells and becoming bound (Kapalka et al., 2010; Rahman et al., 2016). Nonetheless, the concentration of chloride in the effluent was found to be stable, demonstrating that in situ electrochemical hypochlorination continues to regenerate free chlorine while conserving chloride. All other measured nutrients were stable under the test conditions (data not shown) as determined by slope analysis (all slopes=0 at p<0.05), which demonstrated that nutrients can be conserved in this system under prescribed operational conditions.

Higher current densities and longer contact times were also tested and found to have only minor effects on select nutrient ions ($NO_3^-$, $K^+$ & $SO_4^{2-}$) (data not shown). pH in the solution is regulated to control increase nitrogen loss from the fertigation solution and chloramine formation. This said, pH is routinely adjusted in production systems and at typical fertigation solution pH levels (i.e., 5.4-6.5) nitrogen should be stable. Only minor effects on macronutrient ions were noted.

Direct Operational Costs

The electrolytic power cost was considered for the 2.27 $mA/cm^2$ current density profile (i.e., costs of ancillary equipment not included in calculations). This current density resulted in a high pathogen inactivation rate within a 1-min contact time or a flow rate of 380 mL/min (FIG. 7A), which is sufficient to accommodate a bench-scale crop production trial with a fertigation reservoir of 200 L. Under continuous operation, the current EFC configuration would use 0.447 kWh for treating 1000 L of solution. At an energy price of $0.12/kWh this translates to a treatment cost of $0.05/$m^3$. However, the time needed for treating this volume of irrigation solution is 43.86 hours. If using a current density of 4.55 $mA/cm^2$ at nearly double the flow rate (720 mL/min), the cost remains the same but the treatment time is reduced to 23.15 hours. These calculations are basic and do not account for additional energy and hardware costs, nor do they represent a reasonable treatment cycle.

Example 2—Boron Doped Diamond (BDD) Electrodes and Organic Fertilizer in the Electrochemical Cell System An organic fertilizer was added into solution and treated with Dimensionally Stable Anodes (DSA) and Boron Doped Diamond electrodes. The solutions were measured for TOC (total organic carbon), TN (total nitrogen) and individual ions in solution noting the differences prior and after treatment using both technologies.

The source of ammonium and nitrate in fertigation solution containing organic fertilizer was determined and revealed possible mechanisms for the inactivation of fungi. Further it was determined that BDD electrodes can be used with an organic fertilizer. Organic fertilizers contain proteins and the degradation products ($NH_4^+$ and $NO_3^-$) are not readily bioavailable for plant growth. The proteins need to be converted to other forms through bacterial degradation, which can be problematic for various reasons. Electrochemical mineralization of these organics and releasing these ions is demonstrated herein to be a reliable resource for providing these essential ions for crop growth in the fertigation solution.

Using Dimensionally Stable Anodes there was no significant decrease for TOC and TN with the current density of 1.14 $mA/cm^2$ for all contact times (FIG. 9). However, when increasing the current density to 2.27 and 4.55 $mA/cm^2$, there were significant decreases with TOC and TN. The DSA's showed significant increases in calcium with current density and the contact time for all but the current density of 1.14 $mA/cm^2$ at the 3-minute contact time (FIG. 10A). Furthermore, the analysis showed increases and decreases in phosphate and sulphate for random parameters, however none of these were found to be significant (FIGS. 10A and 10B). However, there was a significant increase in potassium for the current density of 2.27 $mA/cm^2$ with a 3-minute contact time and 1.14 $mA/cm^2$ for the 2-minute contact time (FIG. 10B). No significant increases in ammonium and nitrate were found for all parameters, however, there was a significant decrease for the current density of 1.14 $mA/cm^2$ with the 3-minute contact time (FIG. 10A). With higher current densities, there is denitrifying occurring, however, the rate of ammonium released and nitrification is counteracting the denitrification process. Although, there is still a loss of TN from the solution, ions will be released from the organics and replenish the ions that are being lost by denitrification.

With the use of BDD electrodes, there were significant decreases in TOC for every parameter, except for the current density of 1.14 $mA/cm^2$ and a contact time of 1-minute (FIG. 11). There were no significant differences in the total nitrogen of the solution, indicating that denitrification is not active like the previous experiments conducted with DSA's.

With analyzing the ions in solution using the BDD electrodes, there were clear trends by increasing nutrients within the irrigation solution. There were significant increases in calcium, nitrate, ammonium (FIG. 12A). There were some changes in the mean for phosphate throughout the treatments. There were significant decreases in potassium for current densities with treatment (FIG. 12B). Increases by 46.55 mg/L in ammonium were found with the current density of 9.09 $mA/cm^2$ with a 3-minute contact time (FIG. 12A). Furthermore, increases by 22.75 mg/L in nitrate were found with the same current density and contact time.

The BDD system shows compatibility with the use of organic fertilizers, as well as an 'enhancement' of the fertilizer.

Example 3—BDD-Based Electrochemical Advanced Oxidation Process (EAOP) and *Rhizoctonia solani* Inactivation in Fertigation Solutions It was demonstrated that a BDD-based electrochemical advanced oxidation process could achieve sufficient *Rhizoc-* tonia solani inactivation rates in fertigation solutions. Further, the effects of the process on solution fertilizer composition was determined and the phytotoxic potential of the treated solution in terms of residual disinfection products (e.g., free chlorine) was established.

Materials and Methods

Pathogen Culturing

A pure culture of R. solani (AG-8) isolated from wheat was provided courtesy of Dr. Allen Xue at the Plant Pathology Ottawa Research and Development Centre (Agriculture and Agri-Food Canada). Culturing methods described in Lvesque et al., (2018) were used to produce the inoculum used in this study.

Test Solution Preparation

The R. solani culture was vacuum filtered through 1.5 µm filter paper (Whatman 934—AH). The retained material was rinsed with deionized water to remove any residual broth remaining on the mycelia. The mycelia were weighed (TE 124S, Sartorius d=0.1 mg, Germany) to obtain the total mass of mycelia added to the solution. A concentration of 0.2 g/L of mycelia was aimed for the test solution of each experiment conducted. Mycelia were transferred to a blender (HH-362, E.F. Appliances Canada LTD, China) with 300 mL of DI water and blended for 1 minute. The suspension was then transferred to a polypropylene tank containing the irrigation test solution with fertilizer and potassium chloride added. Potassium chloride was added for selective experiments to perform electrochemical chlorination, as performed previously by Lévesque et al., 2019 with DSA electrodes. The composition of the test solution varied between each experiment and for known test solutions is in table 1:

TABLE 1

Composition of irrigation solution for electrochemical treatment using the Boron-Doped Diamond electrodes

| | Chloride Concentration (mg/L) | Fertilizer type | Fertilizer concentration (g/L) |
|---|---|---|---|
| FIG. 14 | 0 | Plant Prod Water Soluble Fertilizer (20-8-20) | 0.5 |
| FIG. 15 | 20 | Plant Prod Water Soluble Fertilizer | 0-0.5 |
| FIG. 17 | 20 | Plant Prod Water Soluble Fertilizer | 0.5 |
| FIG. 18 | 20 | Plant Prod Water Soluble Fertilizer | 0.5 |

Flow Cell

The electrochemical flow cell (EFC) utilized here was described previously (Lévesque et al., 2018). In the current study, the ruthenium dioxide anodes were replaced with Boron-Doped Diamond (BDD) anodes, while the stainless-steel cathodes remained. The cell volume between the electrodes was 380 mL and the flow rates used for experiments was 720, 380, 190 and 127. The reported contact times (in minutes) approximate the time, as a function of flow rate, that the irrigation solution is indirect contact with, or in the immediate vicinity of, the surface of the electrodes during each electrochemical treatment.

A power supply (DF1730SC 20A DC power supply, Gold Source, China) was connected to the anode and cathode terminals. Throughout each experiment the applied current and voltage were monitored. Effluent samples were collected at pre-defined times (see Lévesque et al., 2018) and immediately analyzed to determine pH (542, Corning, USA), and free chlorine concentration (DPD Test 'N Tube cuvette with free chlorine reagent set kit; DR850 portable colorimeter, Hach Company, USA). Untreated samples were collected from the polypropylene tank at the start, middle and end of each experiment for fungal enumeration. This allowed for a representative estimation (mean) for the initial concentration of pathogens and nutrients that enter the system before applying a treatment. All samples were collected in 40 mL clear plastic high-density polyethylene (HDPE) vials (20120121, Richard's Plastics, Canada).

Samples were serially diluted ($10^1$, $10^2$, $10^3$ and $10^4$) into glass test tubes using 500 µl of the sample from the original concentration. The samples (100 µL/plate) were then inoculated onto PDA plates with antibiotics (0.1 g/L of streptomycin and 0.05 g/L of ampicillin) and spread across the plate with a sterile metal hockey stick. The plates were placed in an incubator (Innova 4340, New Brunswick Scientific, USA) at 30° C. for 48 hours under 58 µmol/$m^2$ of light on a 12 h photoperiod. Colonies were counted after the incubation period to determine the survival rate of pathogens following the electrochemical treatment.

Nutrient and Perchlorate Analysis

Individual macronutrient ions from the fertilizer solution were measured with a Shimadzu HPLC system equipped with a DGU-20A3 degasser, a SIL-10AP autosampler, two LC-20AT pumps, two CDD-10A VP conductivity detectors, CTO-20AC column oven, and CBM-20A system controller. Total nitrogen was measured using a Shimadzu TOC analyzer with a total nitrogen component attachment (TNM-1, Shimadzu Scientific Instruments, USA). Perchlorate was analyzed following according to Uchikawa (1967). Samples containing fertilizer were not analyzed for perchlorate due to interference with nitrate (Uchikawa, 1967).

Statistical Analysis

Statistical analyses were performed using JMP version 14.0 (SAS Institute Inc, Cary, NC). Data was tested for normality using the Shapiro-Wilk test. Data sets failing the Shapiro-Wilk test were transformed and the analysis was conducted on the transformed data. Summary of fit from linear regression models used the adjusted R squared values and significance was determined using a =0.05. Linear regression analysis was conducted to determine any effects on [individual] nutrient composition.

Pathogen Inactivation in the Absence of Fertilizer or Chloride Salts

When only R. solani is present in deionized water, a low current density of 1.14 mA/$cm^2$ resulted in a moderate decrease in culturable R. solani (FIGS. 13A-13D). When the contact time of the solution was increased to 6-minutes, there was a log reduction of 3.65 in R. solani from an initial concentration of 6666±850 CFU/mL. Increasing the current density to 2.27 mA/$cm^2$ resulted in a log reduction of 3.80 at the same six-minute contact time. A major factor contributing to the inactivation of pathogens is by indirect oxidation by ROS ($H_2O_2$, $O_3$, $O2^{\cdot-}$) in the bulk solution. The most powerful ROS (•OH) is a factor for disinfection (Diao et al., 2004).

The combination of all ROS causes damage to the cell membrane, which ruptures and releases cell constituents leading to inactivation (Diao et al., 2004). This combination of ROS that are contributing to inactivation rates offers explanation for the efficacy of electrochemical disinfection in removing the majority of pathogens. Although, there are some additional factors that should be considered with electrochemical disinfection. Reductions can also be explained by the acidity at the vicinity of the anodes causing structural changes to the mycelial sheath, which can cause cleavage of essential proteins (Altun & Cetinus, 2007; Kraft, 2008; Permentier & Bruins, 2004; Tsong, 1990). There is also the possibility of increased permeability of the mycelial membrane due to electroporation, which leads to leakage of intracellular contents into solution (Pillet et al., 2016; Rowan et al., 2000; Vega-Mercado et al., 1996). It must be noted that although the current densities used for the experiment were low, the voltages where found to be high due to the absence of a supporting electrolyte. The voltage was found to vary ~15 V with 1.14 mA/cm$^2$ and 32 V with a current density of 2.27 mA/cm$^2$.

Pathogen Inactivation in the Presence of Fertilizer Salts

Pathogen inactivation efficacy was evaluated in solutions containing fertilizer salts but no added chloride. In comparison to the results shown in FIGS. 13A-13D, when applying 1.14 mA/cm$^2$ for a contact time of 6-minutes the inactivation of R. solani is partially inhibited by the presence of fertilizer in solution, which reached a log reduction of 3.58 CFU/mL. There was a reduction in inactivation rates by 22% (with 1.14 mA/cm$^2$) when fertilizer was present in solution in comparison to when fertilizer was absent (FIGS. 13A-13D and 14). This result consistently follows with the same contact time (6-minutes) but increasing the current density to 2.27 mA/cm$^2$ by achieving a log reduction of 3.54. This decrease in log reduction equates to a reduction in inactivation rates by 33% with the presence of fertilizer in solution. When increasing the current density to 4.55 mA/cm$^2$, inactivation rates increase to a log reduction of 3.67 CFU/mL for the 6-minute contact time. Further increasing the current density to 6.82 and 9.09 mA/cm$^2$ reached log reductions of 3.66 CFU/mL for the former and 3.68 CFU/mL for the latter between 0 and 6-minute contact times. The rate of *R. solani* inactivation is likely caused by competing reactions with components present in the fertilizer. The fertilizer can act as a sink for produced disinfectants in solution and fertilizer components can compete with reactions for inactivating *R. solani* by hydroxyl radicals and other ROS. Nonetheless, the presence of a commercial fertilizer reduced the inactivation rates of *R. solani*, it did not completely inhibit the system from inactivating pathogens (inactivated 64% of pathogens). Additional oxidants, such as free chlorine, may be added to achieve the complete inactivation of *R. solani*.

Chloride Addition Experiments: Free Chlorine and Perchlorate Evolution

Free chlorine in the flow cell effluent was monitored while treating solutions containing 20 mg/L of chloride, added as potassium chloride (KCl), over a range of current densities, contact times and fertilizer concentrations (FIG. 15; Table 1). Without fertilizer present, the concentration of free chlorine tended to increase with contact time and current density (FIG. 15). The concentration of free chlorine increased with current density but plateaued at about 2 mg/L beyond a contact time of 2-minutes for current densities of 6.82 and 9.09 mA/cm$^2$. The saturation point for these current densities and contact times suggests the process reached a physical or electrochemical limit; a limit most likely mass transport related (Gileadi, 2011). The efficiency of BDD electrodes for producing hydroxyl radicals and further oxidizing chlorinated products (e.g. $ClO^-$) can lead to the formation of chlorates and perchlorates (Chaplin, 2014; Kraft, 2008; Sirés et al., 2014). The comparatively (i.e., relative to DSAs designed for free chlorine production; Lévesque et al., 2018) low concentration free chlorine from the EFC may be in part due to the formation of chlorate species, which are not measured via the DPD free chlorine method used. When fertilizer is present in solution, the effluent-free chlorine concentration decreased to <0.25 mg/L for all current densities and contact times (FIG. 15).

The EFC system outfitted with BDD electrodes has the potential to form chlorate species (Bergmann et al., 2009; Chaplin, 2014; Kapalka et al., 2010; Kraft, 2008; Sirés et al., 2014). Perchlorates are particularly harmful to human health and this compound can be assimilated by crops (Sanchez et al., 2005; Severt, 2004). Perchlorates can accumulate and decompose inside crops; however, this process is species specific, which poses a risk for consumers. Close monitoring of perchlorate is needed to ensure that the EFC with BDD electrodes can be implemented in greenhouse production, while only permitting concentrations under regulatory standards (Kraft, 2008; Sorensen & Trumble, 2004). Analysis of perchlorates (fertilizer free solutions only) showed that perchlorate remained below 2 μg/L (FIG. 4), which is below safe drinking water limits in all jurisdictions examined (e.g., United States EPA limit 24.5 μg/L) (Kucharzyk et al., 2009; EPA, 2017). Perchlorate was the only chlorate species examined in the current study. Additional chlorate species should be examined to better understand the potential for chlorate production. The formation of chlorate and perchlorate requires the production of hypochlorite as an intermediate species (Sinchez-Carretero et al., 2011). If the pH of the solution is maintained at more acidic conditions with low current densities, this will limit the formation of chlorates. Also, the presence of fertilizer can act as an inhibiting factor to the formation of chlorates and perchlorate due to more competing reactions at the surface of the anodes. This process for competing reactions is similar to preventing the formation of chlorates by increasing the concentration of chloride. There are also additional electrochemical mechanisms that can remove chlorates by reduction reactions, which returns chlorates back to chloride and oxygen and can be used to prevent or remove chlorates in solution as precautionary measures with the EFC.

Adding chloride to the fertigation solution further increased the inactivation rate of *R. solani* (FIG. 17A). When applying a current density of 1.14 mA/cm$^2$ with a contact time of 3-minutes, there was a 69% reduction of *R. solani* (CFU/mL). When increasing the current density to 2.27 mA/cm$^2$ with the 2-minute contact time, there was a decrease by 99.95% of pathogens in solution. For the same current density, but with the increased contact time of 3-minutes, *R. solani* was completely inactivated. When applying 4.45 mA/cm$^2$, an inactivation rate of 99.98% was achieved for the 2-minute contact time. Increasing the current density to 6.82 mA/cm$^2$, gave the same inactivation in half the time (1-min CT). The highest current density tested (9.09 mA/cm$^2$) gave an inactivation of 98.95% at a 0.5-minute contact time and complete inactivation at a 1-minute contact time. Inactivation efficiency improved considerably when 20 mg/L of chloride was introduced, as KCl, to the fertigation solution (FIG. 17A). However, in comparison to previous research with DSA electrodes, the required current density is higher (9.09 mA/cm$^2$ for BDD vs 6.82 mA/cm$^2$ for DSA) and the contact time is twice that required for $RuO_2$ DSA (1-minute for BDD vs 30 seconds for RuO DSA).

The free chlorine evolution from BDD electrodes was also monitored to ensure that the system would not release a concentration of free chlorine above the phytotoxic threshold for most major crops (2.5 mg/L) (FIG. 17B). The effluent free-chlorine concentration does not follow a consistent trend with increasing the contact time and current density of the system. However, the main aspect is that all measured values are considerably lower than the phytotoxic threshold.

Plant Nutrient Dynamics The individual ions comprising the fertilizer solution were monitored pre- and post-treatment at a current density of 9.09 mA/cm$^2$ (FIG. 18). No differences were detected for phosphate, sodium, potassium, magnesium, and calcium. Chloride showed a significant decrease with contact time, which is consistent with the pseudo-first-order kinetics governing the formation of free chlorine species. Chloride had decreased by 2.99±0.16 mg/L with a current density of 9.09 mA/cm$^2$ and a contact time of 1-minute and decreased by 7.69±0.13 mg/L for 3-minutes. Several ions increased slightly after a 3-minute treatment. There were significant increases between the 0 and 3-minute contact times in nitrate by 6.35±0.28 mg/L (p=0.0078), ammonium by 5.32±0.63 mg/L (p=<0.0001), and sulphate by 1.72±0.43 mg/L (p=<0.0001) (FIGS. 18A and 18B). The increase in nitrate may be due to the direct and/or indirect oxidation of ammonium (Benito et al., 2017). The increases in sulphate could be attributed to the oxidation of trace amounts of sulphide (Kraft, 2007; Waterston et al., 2007) or sulphur containing amino acids such as cysteine and methionine (Stipanuk & Ueki, 2011). An alternative source of these ions could be from the degradation of proteins and subsequent deamination of amino acids (Berg et al., 2002; Enache & Oliveira-Brett, 2011; Goldstein et al., 1992b). The deamination of amino acids has been known to occur in the presence of radical species. The reactions are catalyzed by copper ions, which were present in trace amounts in the fertilizer used in the experiment (Goldstein et al., 1992a). The increase in nitrate, ammonium and sulphate is supported by the decrease of non-purgeable organic carbon (NPOC) when only the pathogen and deionized water are present in solution (FIG. 19). The decrease in NPOC indicates that dissolved components in solution that originated from the pathogen are being mineralized. When mineralization occurs, this will release $CO_2$ as well as other ions that were shown to increase with EAOP due to the action of OH (Florenza et al., 2014; Marselli et al., 2003; Özcan et al., 2013; Ruiz et al., 2011). These increases in essential ions were statistically significant. Other organic components, in addition to living cells, may be investigated for degradation and release of nutrients that could greatly improve growth conditions for crops.

It was summarized that applying a low current density (2.27 mA/cm$^2$) without the presence of fertilizer or chloride in solution can inactivate 95% of *R. solani*. Complete inactivation was achieved with the presence of fertilizer and 20 mg/L of chloride in solution. Complete inactivation of *R. solani* can be achieved electrochemically using BDD anodes and stainless-steel cathodes at a current density of 2.27 mA/cm$^2$ and contact time of 3-minutes. However, the contact time required for complete inactivation can be reduced through a concomitant increase in current density, with 9.09 mA/cm$^2$ achieving complete inactivation after 1-minute when fertilizer and chloride are present. The complete inactivation of *R. solani* was achieved while maintaining acceptable nutrient balances and without a build-up of free chlorine beyond reported phytotoxic thresholds. Perchlorate generation was a concern; however, the concentration remained below accepted drinking water quality standards in the absence fertilizer. Many essential nutrients for plant growth were shown to remain constant with reaching complete inactivation (9.09 mA/cm$^2$+fertilizer+chloride). Increases in these nutrients were shown for the ions ammonium, nitrate and sulphate. The decrease in NPOC when only the pathogen is present in solution suggests the mineralization of dissolved components are releasing these nutrients.

While this disclosure has been described in connection with what is presently considered to be practical exemplary embodiments, it is to be understood that the present invention is not limited to the disclosed embodiments, but, on the contrary, is intended to cover various modifications and equivalent arrangements. Thus it should be understood that various changes and modifications to the described embodiments herein will be apparent to those skilled in the art. Such changes and modifications can be made without departing from the spirit and scope of the present subject matter and without diminishing its intended advantages. It is therefore intended that such changes and modifications be covered by the appended claims.

REFERENCES

Agrawal, A., Pandey, R. S., & Sharma, B. (2010). Water pollution with special reference to pesticide contamination in India. *Journal of Water Resource and Protection*, 2(05), 432.

Altun, G. D., & Cetinus, S. A. (2007). Immobilization of pepsin on chitosan beads. *Food chemistry*, 100(3), 964-971.

Álvarez, I., Raso, J., Palop, A., & Sala, F. J. (2000). Influence of different factors on the inactivation of *Salmonella senftenberg* by pulsed electric fields. *International Journal of Food Microbiology*, 55(1-3), 143-146.

Aronsson, K., & Rönner, U. (2001). Influence of pH, water activity and temperature on the inactivation of *Escherichia coli* and *Saccharomyces cerevisiae* by pulsed electric fields. *Innovative Food Science & Emerging Technologies*, 2(2), 105-112.

Balasubramanian, B., Pogozelski, W. K., & Tullius, T. D. (1998). DNA strand breaking by the hydroxyl radical is governed by the accessible surface areas of the hydrogen atoms of the DNA backbone. *Proceedings of the National Academy of Sciences*, 95(17), 9738-9743.

Benito, A., Penadé, A., Lliberia, J. L., & Gonzalez-Olmos, R. (2017). Degradation pathways of aniline in aqueous solutions during electro-oxidation with BDD electrodes and UV/H 2 O 2 treatment. *Chemosphere*, 166, 230-237.

Berg, J. M., Tymoczko, J. L., & Stryer, L. (2002). *The first step in amino acid degradation is the removal of nitrogen. Biochemistry* (5th ed.).

Bergmann, M. H., Rollin, J., & Iourtchouk, T. (2009). The occurence of perchlorate during drinking water electrolysis using BDD anodes. *Electrochimica Acta*, 54(7), 2102-2107.

Bloecher, C. (2007). Elimination of micropollutants and hazardous substances at the source in the chemical and pharmaceutical industry. *Water Science and Technology*, 56(12), 119-123.

Bagotsky, V. S. (Ed.). (2005). *Fundamentals of electrochemistry* (Vol. 44). John Wiley & Sons.

Beeson, W. T., Phillips, C. M., Cate, J. H., & Marletta, M. A. (2011). Oxidative cleavage of cellulose by fungal copper-dependent polysaccharide monooxygenases. *Journal of the American Chemical Society*, 134(2), 890-892.

Bunce, N. J., Merica, S. G., & Lipkowski, J. (1997). Prospects for the use of electrochemical methods for the destruction of aromatic organochlorine wastes. *Chemosphere*, 35(11), 2719-2726.

Bush, E. A., Hong, C., & Stromberg, E. L. (2003). Fluctuations of *Phytophthora* and *Pythium* spp. in components of a recycling irrigation system. *Plant Disease*, 87(12), 1500-1506.

Casey, J. R., Grinstein, S., & Orlowski, J. (2010). Sensors and regulators of intracellular pH. *Nature reviews Molecular cell biology*, 11(1), 50.

Casson, L., & Bess, J. (2002). Conversion to on-site sodium hypochlorite generation: water and wastewater applications. CRC Press.

Cayanan, D. F., Zhang, P., Liu, W., Dixon, M., & Zheng, Y. (2009). Efficacy of chlorine in controlling five common plant pathogens. *HortScience*, 44(1), 157-163.

Cayanan, D. F., Zheng, Y., Zhang, P., Graham. T., Dixon, M., Chong, C., & Llewellyn, J. (2008). Sensitivity of five container-grown nursery species to chlorine in overhead irrigation water. *HortScience*, 43(6), 1882-1887.

Comninellis, C., Kapalka, A., Malato, S., Parsons, S. A., Poulios, I., & Mantzavinos, D. (2008). Advanced oxidation processes for water treatment: advances and trends for R&D. *Journal of Chemical Technology and Biotechnology*, 83(6), 769-776.

Cornell, A., Hfkansson, B., & Lindbergh, G. (2003). Ruthenium based DSA® in chlorate electrolysis—critical anode potential and reaction kinetics. *Electrochimica acta*, 48(5), 473-481.

Comninellis, C. (1994). Electrocatalysis in the electrochemical conversion/combustion of organic pollutants for waste water treatment. *Electrochimica Acta*, 39(11-12), 1857-1862.

Comninellis, C., & Chen, G. (2010). Electrochemistry for the Environment. New York: Springer, 2015.

Delpla, I., Jung, A. V., Baures, E., Clement, M., & Thomas, O. (2009). Impacts of climate change on surface water quality in relation to drinking water production. *Environment international*, 35(8), 1225-1233.

Ding, Z., Quinn, B. M., & Bard, A. J. (2001). Kinetics of heterogeneous electron transfer at liquid/liquid interfaces as studied by SECM. *The Journal of Physical Chemistry B*, 105(27), 6367-6374.

Drees, K. P., Abbaszadegan, M., & Maier, R. M. (2003). Comparative electrochemical inactivation of bacteria and bacteriophage. *Water research*, 37(10), 2291-2300.

Ehret, D. L., Alsanius, B., Wohanka, W., Menzies, J. G., & Utkhede, R. (2001). Disinfestation of recirculating nutrient solutions in greenhouse horticulture. *Agronomie*, 21(4), 323-339.

Enache, T. A., & Oliveira-Brett, A. M. (2011). Boron Doped Diamond and glassy carbon electrodes comparative study of the oxidation behaviour of cysteine and methionine. *Bioelectrochemistry*, 81(1), 46-52.

Evans, R. D. (1994). Control of microorganisms in flowing nutrient solutions. *Advances in Space Research*, 14(11), 367-375.

Fan, F. R. F., Fernandez, J., Liu, B., Mauzeroll, J., Zoski, C. G., & Zoski, C. G. (2007). Handbook of Electrochemistry. *Handbook of Electrochemistry*.

Fukuzaki, S. (2006). Mechanisms of actions of sodium hypochlorite in cleaning and disinfection processes. *Biocontrol science*, 11(4), 147-157.

Florenza, X., Solano, A. M. S., Centellas, F., Martínez-Huitle, C. A., Brillas, E., & Garcia-Segura, S. (2014). Degradation of the azo dye Acid Red 1 by anodic oxidation and indirect electrochemical processes based on Fenton's reaction chemistry. Relationship between decolorization, mineralization and products. *Electrochimica Acta*, 142, 276-288.

Goldstein, S., Czapski, G., Cohen, H., & Meyerstein, D. (1992a). Deamination of β-alanine induced by hydroxyl radicals and monovalent copper ions: a pulse radiolysis study. *Inorganica Chimica Acta*, 192(1), 87-93.

Goldstein, S., Czapski, G., Cohen, H., & Meyerstein, D. (1992b). Hydroxyl radical induced decarboxylation and deamination of 2-methylalanine catalyzed by copper ions. *Inorganic Chemistry*, 31(12), 2439-2444.

Graham, T., Zhang, P., & Dixon, M. A. (2012). Closing in on upper limits for root zone aqueous ozone application in mineral wool hydroponic tomato culture. *Scientia Horticulturae*, 143, 151-156.

Ghimire, S. R., Richardson, P. A., Kong, P., Hu, J., Lea-Cox, J. D., Ross, D. S., Moorman, G. W., Hong, C. (2011). Distribution and Diversity of *Phytophthora* species in Nursery Irrigation Reservoir Adopting Water Recycling System During Winter Months. *Journal of Phytopathology*, 159(11-12), 713-719.

Gileadi, E. (2011). *Physical electrochemistry: fundamentals, techniques and applications.*

Grant, G. A., Fisher, P. R., Barrett, J. E., & Wilson, P. C. (2018). Removal of paclobutrazol from irrigation water using granular-activated carbon. *Irrigation Science*, 1-8.

Hong, C. X., & Moorman, G. W. (2005). Plant pathogens in irrigation water: challenges and opportunities. *Critical Reviews in Plant Sciences*, 24(3), 189-208.

Hong, C. X., Richardson, P. A., Kong, P., and Bush, E. A. 2003. Efficacy of Chlorine on Multiple Species of *Phytophthora* in Recycled Nursery Irrigation Water. *Plant Disease*, 87(10): 1183-1189.

Heponiemi, A., & Lassi, U. (2012). Advanced Oxidation Processes in Food Industry Wastewater Treatment—A Review. *Food Industrial Processes—Methods and Equipment. InTech*, 313-338.

Igura, N., Fujii, M., Shimoda, M., & Hayakawa, I. (2004). Research Note: Inactivation Efficiency of Ozonated Water for. *Ozone: Science & Engineering*, 26(5), 517-521.

Ibrahim, S., Kiran, A., Rashid, M., Yamin, S., Zarlish, A., Munir, S., & Tehreem, R. (2015). The efficacy of chlorinated water used for irrigation purpose on plant initial growth. *Journal of Pharmacognosy and Phytochemistry*, 4(4), 17.

Kashian, D. R., & Dodson, S. I. (2002). Effects of common-use pesticides on developmental and reproductive processes in Daphnia. *Toxicology and industrial health*, 18(5), 225-235.

Kishimoto, N., Morita, Y., Tsuno, H., & Yasuda, Y. (2007). Characteristics of electrolysis, ozonation, and their combination process on treatment of municipal wastewater. *Water Environment Research*, 79(9), 1033-1042.

Kleinman, P. J., Sharpley, A. N., Mcdowell, R. W., Flaten, D. N., Buda, A. R., Tao, L., Bergstrom, L., Zhu. Q. (2011). Managing agricultural phosphorus for water quality protection: principles for progress. *Plant and Soil*, 349(1-2), 169-182.

Kraft, A. (2008). Electrochemical water disinfection: a short review. *Platinum metals review*, 52(3), 177-185.

Kraft, A., Stadelmann, M., Blaschke, M., Kreysig, D., Sandt, B., Schroder, F., & Rennau, J. (1999). Electrochemical water disinfection Part I: Hypochlorite production from very dilute chloride solutions. *Journal of Applied Electrochemistry*, 29(7), 859-866.

Krulwich, T. A., Sachs, G., & Padan, E. (2011). Molecular aspects of bacterial pH sensing and homeostasis. *Nature Reviews Microbiology*, 9(5), 330.

Kuprina, E. E., Vodolazhskaya, S. V., & Nyanikova, G. G. (2003). Destruction and hydrolysis of proteins in their electrochemical extraction. *Russian journal of applied chemistry*, 76(4), 639-642.

Kraft, A. (2007). Doped diamond: a compact review on a new versatile electrode material. *International Journal of Electrochemistry*, 2(3), 355-385.

Kruidenier, L. A., & Verspaget, H. W. (2002). Review article: oxidative stress as a pathogenic factor in inflammatory bowel disease—radicals or ridiculous? *Alimentary Pharmacology & Therapeutics*, 16(12), 1997-2015.

Kucharzyk, K. H., Crawford, R. L., Cosens, B., & Hess, T. F. (2009). Development of drinking water standards for perchlorate in the United States. *Journal of Environmental Management*, 91(2), 303-310.

Li, H., Zhu, X., & Ni, J. (2011). Electrochimica Acta Comparison of electrochemical method with ozonation, chlorination and monochloramination in drinking water disinfection. *Electrochimica Acta*, 56(27), 9789-9796.

Liang, S., Lin, H., Habteselassie, M., & Huang, Q. (2018). Electrochemical inactivation of bacteria with a titanium sub-oxide reactive membrane. *Water Research*, 145, 172-180.

Lazarova, V., & Bahri, A. (Eds.). (2004). *Water reuse for irrigation: agriculture, landscapes, and turf grass*. CRC Press.

Liang, W., Qu, J., Chen, L., Liu, H., & Lei, P. (2005). Inactivation of *Microcystis aeruginosa* by continuous electrochemical cycling process in tube using $Ti/RuO_2$ electrodes. *Environmental Science & Technology*, 39(12), 4633-4639.

March, J. G., & Gual, M. (2009). Studies on chlorination of greywater. *Desalination*, 249(1), 317-322.

Meador, D. P., & Fisher, P. R. (2013). Ammonium in nutrient solutions decreases free chlorine concentration from sodium hypochlorite. *HortScience*, 48(10), 1304-1308.

Mullins, B. N., & Sink, T. D. (2015). Principles of small-scale aquaponics. *Southern Regional Aquaculture Center*, 1-8.

Marselli, B., Garcia-Gomez, J., Michaud, P.-A., Rodrigo, M. A., & Comninellis, C. (2003). Electrogeneration of Hydroxyl Radicals on Boron-Doped Diamond Electrodes. *Journal of The Electrochemical Society*, 150(3), D79. https://doi.org/10.1149/1.1553790

Martinez-Huitle, C. A., & Brillas, E. (2008). Electrochemical alternatives for drinking water disinfection. *Angewandte Chemie International Edition*, 47(11), 1998-2005.

Nikolić, B. Z., & Panić, V. (2014). Electrocatalysis of chlorine evolution. *Encyclopedia of Applied Electrochemistry*, 411-417.

Özcan, A., Sahin, Y., & Oturan, M. A. (2013). Complete removal of the insecticide azinphos-methyl from water by the electro-Fenton method-A kinetic and mechanistic study. *Water Research*, 47(3), 1470-1479.

Polcaro, A. M., Vacca, A., & Ferrara, F. (2008). Product and by-product formation in electrolysis of dilute chloride solutions. *Journal of Applied Electrochemistry*, 38(7), 979-984.

Panizza, M., & Cerisola, G. (2009). Direct and mediated anodic oxidation of organic pollutants. *Chemical reviews*, 109(12), 6541-6569.

Permentier, H. P., & Bruins, A. P. (2004). Electrochemical oxidation and cleavage of proteins with on-line mass spectrometric detection: development of an instrumental alternative to enzymatic protein digestion. *Journal of the American Society for Mass Spectrometry*, 15(12), 1707-1716.

Pillet, F., Formosa-Dague, C., Baaziz, H., Dague, E., & Rols, M. P. (2016). Cell wall as a target for bacteria inactivation by pulsed electric fields. *Scientific reports*, 6, 19778.

Rahman, S. M. E., Khan, I., & Oh, D. H. (2016). Electrolyzed water as a novel sanitizer in the food industry: current trends and future perspectives. *Comprehensive Reviews in Food Science and Food Safety*, 15(3), 471-490.

Raudales, R. E., Parke, J. L., Guy, C. L., & Fisher, P. R. (2014). Control of waterborne microbes in irrigation: A review. *Agricultural Water Management*, 143, 9-28.

Reemtsma, T., Alder, L., & Banasiak, U. (2013). Emerging pesticide metabolites in groundwater and surface water as determined by the application of a multimethod for 150 pesticide metabolites. *Water research*, 47(15), 5535-5545.

Rowan, N. J., Macgregor, S. J., Anderson, J. G., Fouracre, R. A., & Farish, O. (2000). Pulsed electric field inactivation of diarrhoeagenic *Bacillus cereus* through irreversible electroporation. *Letters in applied microbiology*, 31(2), 110-114.

Rahman, M. M., Ng, J. C., & Naidu, R. (2009). Chronic exposure of arsenic via drinking water and its adverse health impacts on humans. *Environmental Geochemistry and Health*, 31(1), 189-200.

Raudales, R. E., Fisher, P. R., & Hall, C. R. (2017). The cost of irrigation sources and water treatment in greenhouse production. *Irrigation Science*, 35(1), 43-54.

Ruiz, E. J., Hernandez-Ramirez, A., Peralta-Hernndez, J. M., Arias, C., & Brillas, E. (2011). Application of solar photoelectro-Fenton technology to azo dyes mineralization: effect of current density, Fe2+ and dye concentrations. *Chemical Engineering Journal*, 171(2), 385-392.

Stewart-Wade, S. M. (2011). Plant pathogens in recycled irrigation water in commercial plant nurseries and greenhouses: their detection and management. *Irrigation Science*, 29(4), 267-297.

Sanchez, C. A., Crump, K. S., Krieger, R. I., Khandaker, N. R., & Gibbs, J. P. (2005). Perchlorate and nitrate in leafy vegetables in North America. *Environmental Science & Technology*, 39(24), 9391-9397.

Severt, S. A. (2004). *Food safety assessment of perchlorate contaminated crops in rodents*. Texas Tech University.

Sirés, I., & Brillas, E. (2012). Remediation of water pollution caused by pharmaceutical residues based on electrochemical separation and degradation technologies: A review. *Environment International*, 40(1), 212-229.

Sorensen, M. A., & Trumble, J. T. (2004). Bioavailability and bioremediation of perchlorate salts. *Recent Research Developments in Environmental Biology*, 349-363.

Stipanuk, M. H., & Ueki, I. (2011). Dealing with methionine/homocysteine sulfur: cysteine metabolism to taurine and inorganic sulfur. *Journal of Inherited Metabolic Disease*, 34(1), 17-32.

Surez, S., Carballa, M., Omil, F., & Lema, J. M. (2008). How are pharmaceuticals and personal care products (PPCPs) removed from urban wastewater? *Reviews in Environmental Science and Bio/Technology*, 7(2), 125-138.

Tanoue, R., Sato, Y., Motoyama, M., Nakagawa, S., Shinohara, R., & Nomiyama, K. (2012). Plant Uptake of Pharmaceutical Chemicals Detected in Recycled Organic Manure and Reclaimed Wastewater. *Journal of Agricultural and Food Chemistry*, 60(41), 10203-10211. doi: 10.1021/jf303142t Tiehm, A., Lohner, S. T., & Augenstein, T. (2009). Effects of direct electric current and electrode reactions on vinyl chloride degrading microorganisms. *Electrochimica Acta*, 54(12), 3453-3459.

Toze, S. (2006). Reuse of effluent water-benefits and risks. *Agricultural water management*, 80(1), 147-159.

Tsong, T. Y. (1990). On electroporation of cell membranes and some related phenomena. *Journal of electroanalytical chemistry and interfacial electrochemistry*, 299(3), 271-295.

Urano, H., & Fukuzaki, S. (2005). The mode of action of sodium hypochlorite in the cleaning process. *Biocontrol Science*, 10(1-2), 21-29.

Vega-Mercado, H., Pothakamury, U. R., Chang, F. J., Barbosa-Cánovas, G. V., & Swanson, B. G. (1996). Inactivation of *Escherichia coli* by combining pH, ionic strength and pulsed electric fields hurdles. *Food Research International*, 29(2), 117-121.

Waterston, K., Bejan, D., & Bunce, N. J. (2007). Electrochemical oxidation of sulfide ion at a boron-doped diamond anode. *Journal of Applied Electrochemistry*, 37(3), 367-373.

Westerhoff, P. (2003). Reduction of nitrate, bromate and chlorate by zero valent iron (Fe 0). *Journal of Envrionmental Engineering*, 129(1), 10-16.

Zheng, Y., Cayanan, D. F., and Dixon, M. 2008. Control of pathogens in irrigation water using chlorine without injury to plants. Combined Proceedings International Plant Propagators' Society 58: 74-85.

Zöllig, H., Fritzsche, C., Morgenroth, E., & Udert, K. M. (2015). Direct electrochemical oxidation of ammonia on graphite as a treatment option for stored source-separated urine. *Water research*, 69, 284-294.

The invention claimed is:

1. An electrochemical method for the treatment of fertigation water, comprising:
    flowing fertigation water through an electrochemical cell to effect regenerative mediate electrolysis, the electrochemical cell comprising at least one anode and at least one complementary cathode while simultaneously adjusting one or more of current density, flow rate and pH, wherein the at least one anode is a dimensionally stable ruthenium dioxide anode,
    wherein said flowing of said fertigation water continuously regenerates a disinfection agent to control presence of a pathogen in said fertigation water while maintaining nutrient levels; and
    collecting effluent treated fertigation water, wherein the disinfection agent comprises free chlorine at concentrations that remains below phytotoxic thresholds of about 2.5 mg/L for irrigating crops.

2. The method of claim 1, wherein the disinfecting agent is hypochlorous acid.

3. The method of claim 2, wherein chloride ions in the flowing fertigation water are transformed to the hypochlorous acid that neutralizes said pathogen while simultaneously releasing chloride ions back to the fertigation water where the chloride ions migrate back to the at least one anode through electrostatic migration where again, the chloride ions are transformed to hypochlorous acid for neutralizing said pathogen, and wherein chloride concentrations remain stable throughout the treatment of the fertigation water.

4. The method of claim 1, wherein the current density is about 0.76 mA/cm$^2$ to about 9.09 mA/cm$^2$.

5. The method of claim 4, wherein the current density is selected from a range of about 1.14 mA/cm$^2$ to about 9.09 mA/cm$^2$.

6. The method of claim 1, wherein the pH of the fertigation water during treatment is at least about 5.4 and favourable for chloride and nitrogen species in said fertigation water.

7. The method of claim 6, wherein the pH is between about 5.4 to about 8.5 or about 5.5 to 6.5.

8. The method of claim 1, wherein the flow rate is selected to provide a residence time of up to about 10 minutes in the electrochemical cell.

9. The method of claim 1, wherein the method is conducted at about room temperature and/or under ambient light.

10. The method of claim 1, wherein the pathogen is a chloride sensitive pathogen.

11. The method of claim 10, wherein the chloride sensitive pathogen is selected from fungi, bacteria, viruses, oomycetes and mycoplasmas.

12. The method of claim 11, wherein said chloride sensitive pathogen is a fungi.

13. The method of claim 12, wherein the chloride sensitive pathogen is a fungi from the genus *Rhizoctonia* or *Fusarium*.

14. The method of claim 13, wherein the chloride sensitive pathogen is *Fusarium oxysporum* or *Rhizoctonia solani*.

15. The method of claim 1, wherein the method does not require additional chloride salts to sustain disinfection reactions in the fertigation water.

16. A method for conserving water in controlled environment agriculture (CEA), the method comprising the steps of:
    i) circulating the collected effluent treated fertigation water of claim 1 within an irrigation system of the CEA to a crop;
    (ii) collecting captured fertigation water; and
    (iii) recirculating the captured fertigation water through the electrochemical cell to repeat the treatment,
    optionally wherein steps (i) to (iii) are repeated one or more times.

17. The method of claim 1, wherein the fertigation water is captured fertigation water.

18. A controlled environment agricultural system comprising:
    an irrigation system comprising one or more electrically-driven electrochemical flow cells (EFC) comprising at least one anode of a dimensionally stable ruthenium dioxide anode and at least one complementary cathode, each of the EFC fluidly connected to a source of fertigation water to be treated; and an irrigation water distribution system fluidly connected to the one or more electrically-driven EFC,
    wherein flowing fertigation water through the electrochemical cell effects regenerative mediated electrolysis to regenerate free chlorine as a disinfection agent to control presence of a pathogen in said fertigation water while maintaining nutrient levels while one or more of current density, flow rate and pH are simultaneously adjusted,
    wherein effluent treated fertigation water is collected, and
    wherein the free chlorine in said treated fertigation water remains below phytotoxic thresholds of about 2.5 mg/L for crops.

* * * * *